US010759054B1

(12) United States Patent
Patil et al.

(10) Patent No.: US 10,759,054 B1
(45) Date of Patent: Sep. 1, 2020

(54) METHOD AND SYSTEM FOR HANDLING DEFORMABLE OBJECTS

(71) Applicant: GREY ORANGE PTE. LTD., Singapore (SG)

(72) Inventors: Akash Patil, Pune (IN); Avilash Kumar, Jamshedpur (IN); Sumit Tiwary, Gorakhpur (IN); Manish Soni, Baran (IN); Nikhil Sorout, Palwal (IN); Sameer Narkar, Mumbai (IN); Anirudh Shekhawat, Jaipur (IN); Vaibhav Tolia, Gurgaon (IN); Daniel Echeverria, Cambridge, MA (US); Andreas Hofmann, Boston, MA (US); Mathew Livianu, Malden, MA (US); Robert Pitha, Concord, MA (US); Shawn Schaffert, Arlington, MA (US); Andrew Kiruluta, Cambridge, MA (US); Andrew Lewis, Waltham, MA (US)

(73) Assignee: GREY ORANGE PTE. LTD., Singapore (SG)

( * ) Notice: Subject to any disclaimer, the term of this patent is extended or adjusted under 35 U.S.C. 154(b) by 0 days.

(21) Appl. No.: 16/802,375

(22) Filed: Feb. 26, 2020

(51) Int. Cl.
| | |
|---|---|
| *B25J 9/16* | (2006.01) |
| *G06K 9/46* | (2006.01) |
| *G06T 1/00* | (2006.01) |
| *G05B 13/02* | (2006.01) |
| *B25J 9/00* | (2006.01) |

(52) U.S. Cl.
CPC .......... *B25J 9/1682* (2013.01); *B25J 9/0087* (2013.01); *B25J 9/1697* (2013.01); *G05B 13/028* (2013.01); *G06K 9/4604* (2013.01); *G06T 1/0014* (2013.01); *G05B 2219/39001* (2013.01); *G05B 2219/39135* (2013.01); *G05B 2219/39558* (2013.01)

(58) Field of Classification Search
CPC ...... B25J 9/1682; B25J 9/0087; B25J 9/1697; G05B 13/028; G05B 2219/39001; G05B 2219/39135; G05B 2219/39558; G06K 9/4604; G06T 1/0014
See application file for complete search history.

(56) References Cited

U.S. PATENT DOCUMENTS

| | | | | |
|---|---|---|---|---|
| 2012/0196734 A1* | 8/2012 | Endo | ....................... | D06F 89/02 493/405 |
| 2017/0356124 A1* | 12/2017 | Ozeki | ..................... | D06F 95/00 |
| 2019/0390396 A1* | 12/2019 | Kwak | .................... | B25J 9/0084 |

* cited by examiner

*Primary Examiner* — Nicholas Kiswanto
(74) *Attorney, Agent, or Firm* — Oblon, McClelland, Maier & Neustadt, L.L.P.

(57) ABSTRACT

A control server controls a dual-arm robotic manipulator (DARM) for handling deformable objects in a stack. The control server receives a set of images of the stack captured by a set of image sensors, and determines a contour of the stack based the set of images. Based on the contour and historical data associated with the deformable objects in the stack, the control server determines a sequence of actions to be performed by the DARM for handling a first deformable object in the stack, and controls the DARM to handle the first deformable object by communicating a set of commands corresponding to each action in sequence of actions. The first deformable object is handled such that original form factors of the first deformable object and the remaining stack are maintained.

20 Claims, 13 Drawing Sheets

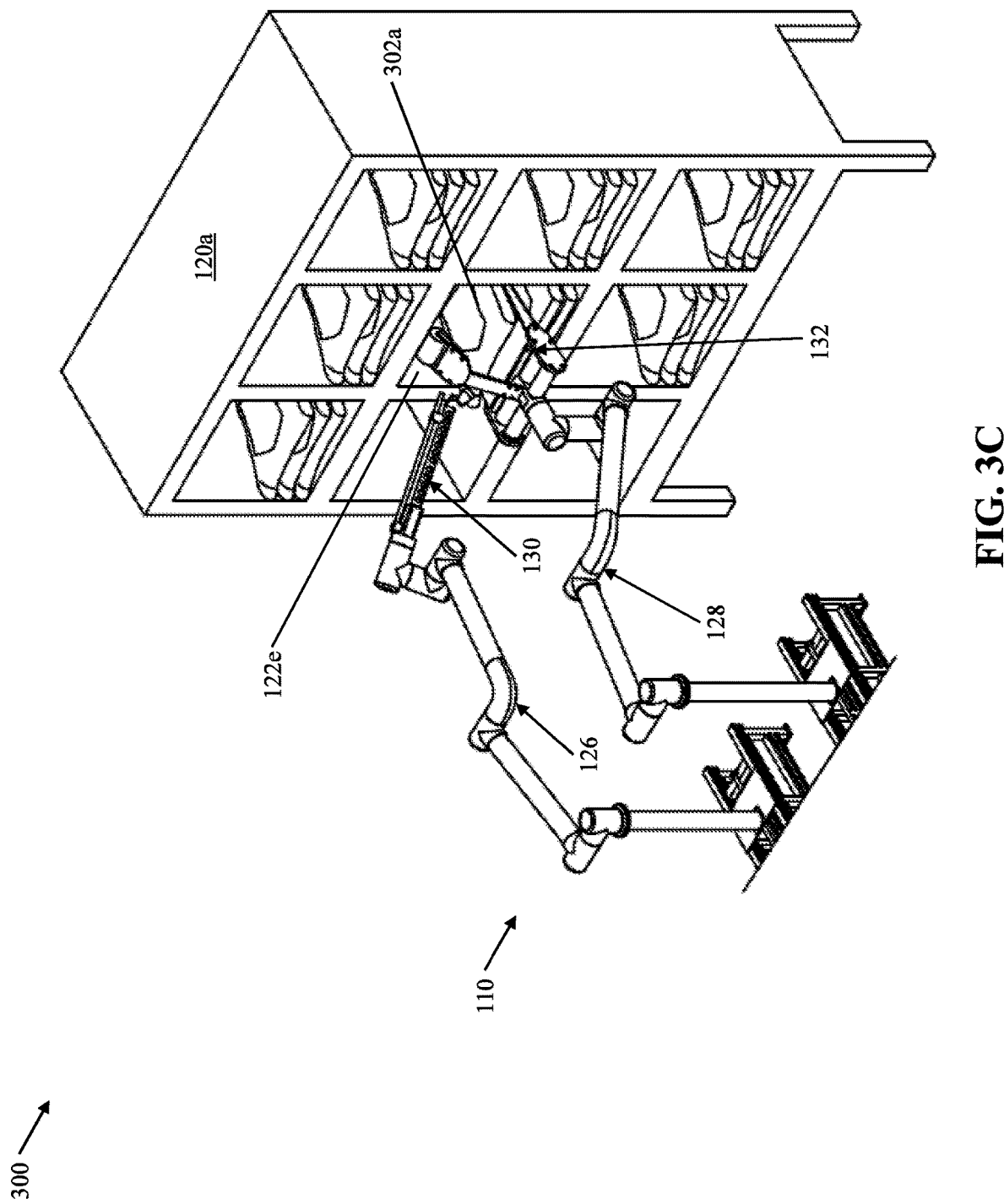

METHOD AND SYSTEM FOR HANDLING DEFORMABLE OBJECTS

FIELD OF THE DISCLOSURE

The present disclosure relates generally to object handling, and more particularly, to a system and a method for handling deformable objects that are arranged in a stack in a storage facility.

BACKGROUND

Modern storage facilities handle a large number of inventory items on a daily basis. Examples of such inventory items may include groceries, apparels, or the like. The storage facilities typically store the inventory items on shelves of storage units, and utilize mobile robots to transport the inventory items or the storage units between various locations in the storage facilities for order fulfillment and/or inventory management. For example, for fulfillment of an order, the mobile robots may transport one or more storage units storing the corresponding inventory items to an operation station in the storage facility. At the operation station, an operator may handle (e.g., pick and put-down) the inventory items for the order fulfillment. Such systems, however, rely on manual intervention which is time-consuming. Further, manual operationality has limited applicability in a large-scale facility that aims to fulfil a large number of orders within a short duration of time.

Robotic manipulators are widely deployed in the storage facilities to solve the aforementioned problem and to ensure efficient management of the inventory items. While the robotic manipulators provide efficient handling of inventory items, they have a few limitations of their own. For example, such robotic manipulators may only be utilized to handle non-deformable inventory items. When such robotic manipulators are utilized to handle deformable objects (e.g., apparels, deformable cartons, or the like) that are arranged in a stack, it is difficult for the robotic manipulators to prevent the deformation of the deformable objects. For example, when a robotic manipulator is utilized for handling a folded pair of jeans, an appearance of the jeans may change from a folded state to an unfolded state (i.e., a deformed state). Also, in an attempt to handle the deformable object arranged in the stack, such robotic manipulators may deform various other objects in the stack. The robotic picking technologies are thus unable to pick up such deformable objects and maintain original form factors of the object (e.g., a form factor in which the deformable object was stored originally) and the rest of the stack.

In light of the foregoing, there exists a need for a technical solution that prevents deformation of the deformable objects when being handled by a robotic manipulator at storage facilities.

SUMMARY

In an embodiment of the present disclosure, a system for handling one or more deformable objects that are arranged in a stack is provided. The system includes a dual-arm robotic manipulator that includes first and second robotic arms, and first and second end effectors connected to the first and second robotic arms, respectively. The system further includes a set of image sensors and a control server that is in communication with the dual-arm robotic manipulator and the set of image sensors. The set of image sensors is configured to capture a first set of images of the stack, and the control server is configured to detect the one or more deformable objects arranged in the stack based on the first set of images captured by the set of image sensors. The control server is further configured to determine a contour of the detected one or more deformable objects based on the first set of images. Based on the contour and historical data associated with the one or more deformable objects, the control server is further configured to determine a sequence of a plurality of actions to be performed by the dual-arm robotic manipulator for handling a first deformable object in the stack. The handling includes a pick operation to be executed on the first deformable object. In the pick operation, the control server is further configured to control, based on the determined sequence of the plurality of actions, the first robotic arm to grip the first deformable object from a gripping end by way of the first end effector, and lift the gripped end to a predetermined height to partially lift the first deformable object. The control server is further configured to control the second robotic arm to slide the second end effector beneath the partially lifted first deformable object, and lift the first deformable object in entirety. The control server is further configured to control the first robotic arm to release the grip of the first end effector on the first deformable object for successfully executing the pick operation.

In another embodiment of the present disclosure, a method for handling one or more deformable objects that are arranged in a stack is provided. The one or more deformable objects that are arranged in the stack are detected by a control server based on a first set of images of the stack captured by a set of image sensors. Further, a contour of the detected one or more deformable objects is determined by the control server based on the first set of images. Based on the contour and historical data associated with the one or more deformable objects, a sequence of a plurality of actions to be performed by a dual-arm robotic manipulator for handling a first deformable object in the stack is determined by the control server. The handling includes a pick operation to be executed on the first deformable object. In the pick operation, based on the determined sequence of the plurality of actions, a first robotic arm of the dual-arm robotic manipulator is controlled by the control server to grip the first deformable object from a gripping end by way of a first end effector connected to the first robotic arm, and lift the gripped end to a predetermined height to partially lift the first deformable object. Further, a second robotic arm of the dual-arm robotic manipulator is controlled by the control server to slide a second end effector connected to the second robotic arm beneath the partially lifted first deformable object, and lift the first deformable object in entirety. The first robotic arm is further controlled by the control server to release the grip of the first end effector on the first deformable object for successfully executing the pick operation.

In another embodiment of the present disclosure, a system for handling one or more deformable objects that are arranged in a stack is provided. The system includes a control server that is configured to detect the one or more deformable objects that are arranged in the stack based on a first set of images of the stack captured by a set of image sensors. The control server is further configured to determine a contour of the detected one or more deformable objects based on the first set of images. Based on the contour and historical data associated with the one or more deformable objects, the control server is further configured to determine a sequence of a plurality of actions to be performed by a dual-arm robotic manipulator for handling a first deformable object in the stack. The handling includes a pick operation to be executed on the first deformable object. In the pick operation, based on the determined sequence of the plurality of actions, the control server is further configured to control a first robotic arm of the dual-arm robotic manipulator to grip the first deformable object from a gripping end by way of a first end effector connected to the first robotic arm, and lift the gripped end to a predetermined height to partially lift the first deformable object. The control server is further configured to control a second robotic arm of the dual-arm robotic manipulator to slide a second end effector connected to the second robotic arm beneath the partially lifted first deformable object, and lift the first deformable object in entirety. The control server is further configured to control the first robotic arm to release the grip of the first end effector on the first deformable object for successfully executing the pick operation.

BRIEF DESCRIPTION OF THE DRAWINGS

The accompanying drawings illustrate the various embodiments of systems, methods, and other aspects of the disclosure. It will be apparent to a person skilled in the art that the illustrated element boundaries (e.g., boxes, groups of boxes, or other shapes) in the figures represent one example of the boundaries. In some examples, one element may be designed as multiple elements, or multiple elements may be designed as one element. In some examples, an element shown as an internal component of one element may be implemented as an external component in another, and vice versa.

Various embodiments of the present disclosure are illustrated by way of example, and not limited by the appended figures, in which like references indicate similar elements:

FIGS. 3A-3E, collectively illustrate an exemplary scenario for handling a deformable object that is arranged in a stack, in accordance with an exemplary embodiment of the present disclosure;

Figure 1:
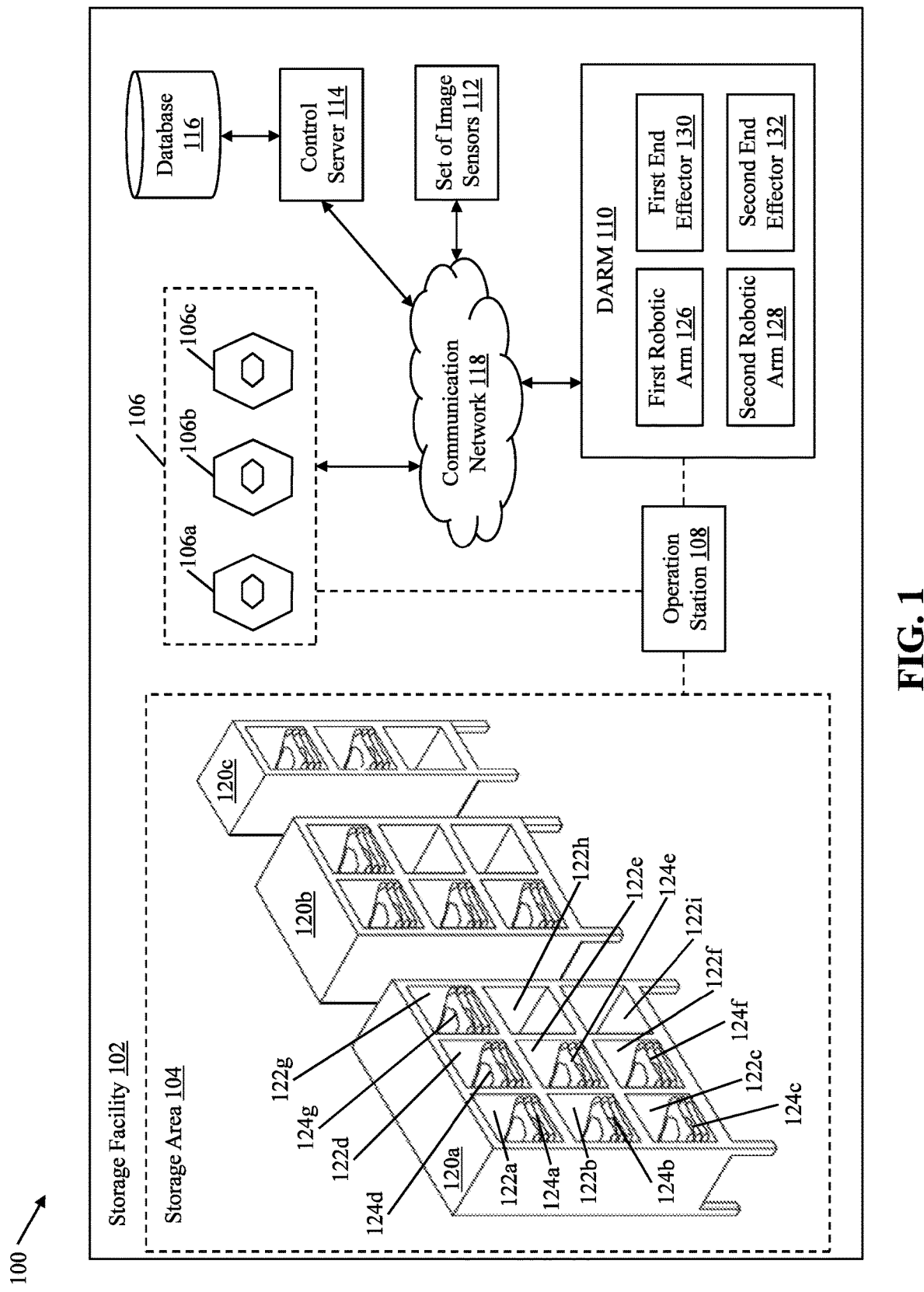
FIG. 1 is a block diagram that illustrates an exemplary environment, in accordance with an exemplary embodiment of the present disclosure.

Further areas of applicability of the present disclosure will become apparent from the detailed description provided hereinafter. It should be understood that the detailed description of exemplary embodiments is intended for illustration purposes only and is, therefore, not intended to necessarily limit the scope of the disclosure.

DETAILED DESCRIPTION

The present disclosure is best understood with reference to the detailed figures and description set forth herein.

Various embodiments are discussed below with reference to the figures. However, those skilled in the art will readily appreciate that the detailed descriptions given herein with respect to the figures are simply for explanatory purposes as the methods and systems may extend beyond the described embodiments. In one example, the teachings presented and the needs of a particular application may yield multiple alternate and suitable approaches to implement the functionality of any detail described herein. Therefore, any approach may extend beyond the particular implementation choices in the following embodiments that are described and shown.

References to "an embodiment", "another embodiment", "yet another embodiment", "one example", "another example", "yet another example", "for example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in an embodiment" does not necessarily refer to the same embodiment.

Various embodiments of the disclosure provide a method and a system that utilize a dual-arm robotic manipulator (DARM) for handling deformable objects that are arranged in a stack in a storage facility. Examples of the storage facility may include a retail store, a forward warehouse, a backward warehouse, a manufacturing facility, an item sorting facility, or the like. The storage facility may include various storage units installed therein, and each storage unit may have various shelves where the deformable objects may be arranged in stacks. Examples of the deformable objects may include apparels, sheets, cartons, or the like. The DARM may include first and second robotic arms having first and second end effectors, respectively.

A control server associated with the storage facility may receive a handling request for handling a first deformable object (interchangeably referred to as a "first object"). The first object may be a part of a stack of deformable objects arranged on a first shelf of a first storage unit in the storage facility. In one embodiment, the first object is on top of the stack. The handling request may be for adjusting the alignment of the first object in the stack or transporting the first object from a source location (e.g., from the first shelf) to a destination location in the storage facility (e.g., another shelf of the first storage unit, a shelf of another storage unit, an operation station in the storage facility, or the like).

According to some embodiments, upon reception of the handling request, the control server may identify a mobile robot for transporting the first storage unit from a first location to a second location that is within an operational range of the DARM for catering to the handling request. The control server may then communicate the first location of the first storage unit to the identified mobile robot. Based on the first location, the mobile robot may approach the first storage unit, lift the first storage unit, and transport the first storage unit to the second location. The DARM is then oriented such that the DARM faces the first storage unit.

The control server may then receive first image data from a set of image sensors. The first image data may be indicative of various images of the stack of deformable objects arranged on the first shelf, where the images may be captured by the set of image sensors. The set of image sensors may be installed on the DARM and/or elsewhere inside the storage facility. In some embodiments, based on the first image data, the control server detects the stack of deformable objects arranged on the first shelf and determines a contour of the deformable objects in the detected stack. The control server may then identify one or more layers in the contour. A layer in the contour may indicate a fold of a deformable object or an entire deformable object in the stack. The control server may then identify perceived depth information of each deformable object in the stack based on the contour.

According to some embodiments, the control server further retrieves, from a database associated with the control server, historical data associated with the deformable objects in the stack. The historical data may include physical attributes of the deformable objects (such as shape, size, weight, number of folds, dimensions, actual depth information, or the like of the deformable objects), various ways in which the deformable objects (or similar type of objects) in the stack were handled historically, or the like. The actual depth information of each deformable object may be a function of the shape, size, number of folds, and dimensions of the corresponding deformable object. Based on the perceived and actual depth information of each deformable object in the stack, the control server may determine an orientation of the first object with respect to remaining deformable objects in the stack.

Upon determination of the layers in the contour and the orientation of the first object, the control server may determine a sequence of actions to be performed by the DARM to handle the first object while maintaining the original form factors of the first object and the remaining stack. As an example, an original form factor defines a non-deformed state of the object. In other words, the original form factor may define the preferred size, shape, and other physical specifications of an object in which it was stored originally in the stack or in the storage facility. The control server may determine the sequence of actions in real-time based on the contour, the layers, the orientation of the first object, and the historical data.

The control server may then communicate a first set of commands corresponding to a first action in the sequence of actions to the DARM. In some embodiments, under the control of the first set of commands, the first robotic arm grips, by way of the first end effector, a gripping end of the first object and lifts the gripped end to the predetermined height. In one example, the first end effector is a vacuum gripper. The gripping end may be identified by the control server based on the contour, the layers, the orientation of the first object, and the historical data. The gripping end may be identified such that the original form factor of the first object is maintained during the lift.

According to some embodiments, as the gripping end is lifted by the first robotic arm, the set of image sensors capture various images of the partially lifted first object and the remaining stack, and communicate second image data indicative of the captured images to the control server. Based on the second image data and the historical data, the control server may identify a gap developed between the partially lifted first object and the remaining stack. When the control server determines that the gripping end is lifted to the predetermined height (e.g., the developed gap is equal to the predetermined height), the control server communicates a second set of commands corresponding to a second action in the sequence of actions to the DARM.

Under the control of the second set of commands, the second robotic arm may slide the second end effector beneath the partially lifted first object. In an example, the second end effector may include a spatula-shaped base, an adjustable arm connected to the spatula-shaped base, and a roller connected to the adjustable arm such that the roller is oriented parallel to and at an adjustable height above the spatula-shaped base. The roller may assist in maintaining the form factor of the first object when the first object is moved by the second end effector.

In some embodiments, once beneath the first object, the second end effector lifts the first object in entirety. The second end effector may be equipped with one or more pressure sensors to determine whether the first object is lifted accurately. The accurate lifting corresponds to a uniform weight distribution of the first object on the second end effector. When the control server determines that the first object has been accurately lifted, the control server may communicate, to the DARM, a third set of commands corresponding to a third action in the sequence of actions. Under the control of the third set of commands, the first robotic arm may release the grip on the first object and the second robotic arm adjusts the height of the adjustable arm such that the roller firmly holds the first object, thereby successfully completing the pick operation by the DARM.

According to some embodiments, when the first object is successfully picked up, the control server communicates, to the DARM, a fourth set of commands corresponding to a fourth action in the sequence of actions. Under the control of the fourth set of commands, the second robotic arm may move the second end effector holding the first object away from the first shelf, and put-down the first object at the destination location. After a successful handling, the historical data associated with the first object may be updated in the database to include plan information (e.g., the set of commands associated with each action in the sequence of actions) as feedback for future handling of similar deformable objects.

Thus, the embodiments of the DARM of the present disclosure, in conjunction with the control server, advantageously ensures that the original form factor of the first object and the remaining stack is maintained during the handling of the first object (i.e., during the pick-up, the transport, and/or the drop-off). In other words, the use of vacuum gripper and spatula-shaped end effectors advantageously prevents the deformation of the first object during the handling. Further, the use of the spatula-shaped end effector ensures that the remaining deformable objects in the stack are unaffected (e.g., are not deformed) during the handling of the first object. Thus, the handling of the deformable objects as described in the disclosure is more efficient as compared to other deformable object handling methods.

In some embodiments, "Deformable object" refers to an object that does not have a rigid shape. Thus, an original form of the deformable object may be marred while handling. Examples of the deformable object may include an apparel, a carton, a sheet, or the like. In one example, when a folded pair of jeans is handled incorrectly, an appearance of the jeans may deform (i.e., change from a folded state to an unfolded state).

In some embodiments, "Contour" refers to an outline representing or bounding a shape. The contour of an object (e.g., a deformable object or a stack of deformable objects) may be determined based on various images of the object captured by image sensors. When each image of the object is projected on a focal plane of a corresponding image sensor, contour information of the object pertaining to that focal plane may be obtained. When the contour information across multiple focal planes are merged, the contour of the object may be obtained. In one example, the contour of a stack of folded deformable objects includes outlines that represent various shapes in the stack. Each outline may be a layer that indicates a fold of a deformable object or the deformable object in entirety.

In some embodiments, "Depth information" of a deformable object indicates distance values from a focal plane of the image sensor to different points on the deformable object. In some embodiments, "Perceived depth information" of the deformable object is identified from a contour of the deformable object. In some embodiments, "Actual depth information" of the deformable object is a function of a shape, a size, number of folds, dimensions, or the like of the deformable object. By comparing the perceived and actual depth information of the deformable object, information pertaining to an orientation of the deformable object may be obtained. For example, when the perceived and actual depth information of the deformable object match, the deformable object is determined to be oriented correctly. In another example, when the perceived and actual depth information of the deformable object do not match, the deformable object is determined to be in an incorrect orientation.

In some embodiments, "Gripping end" is an end of a folded deformable object by way of which if the deformable object is lifted, a folded state of the deformable object is maintained. The gripping end may be identified based on a contour of a stack that includes the deformable object, one or more layers in the contour, an orientation of the deformable object with respect to the stack, and historical data associated with the stack. In an example, the gripping end is a closed end of the folded deformable object.

In some embodiments, "Control server" is a physical or cloud data processing system on which a server program runs. The control server may be implemented in hardware or software, or a combination thereof. In one embodiment, the control server may be implemented in computer programs executing on programmable computers, such as personal computers, laptops, or a network of computer systems.

FIG. 1 is a block diagram that illustrates an exemplary environment 100, in accordance with an exemplary embodiment of the present disclosure. The environment 100 shows a storage facility 102. The storage facility 102 includes a storage area 104, first through third mobile robots 106a-106c, an operation station 108, a dual-arm robotic manipulator (DARM) 110, a set of image sensors 112, a control server 114, and a database 116. The control server 114 communicates with the first through third mobile robots 106a-106c, the DARM 110, and the set of image sensors 112 by way of a communication network 118 or through separate communication networks established therebetween.

The storage facility 102 stores multiple inventory items for fulfillment and/or selling. Examples of the storage facility 102 may include, but are not limited to, a forward warehouse, a backward warehouse, a manufacturing facility, an item sorting facility, or a retail store (e.g., a supermarket, an apparel store, or the like). The inventory items include, but are not limited to, deformable objects such as apparels, sheets, cartons, or the like, and are stored in the storage area 104 of the storage facility 102. The storage area 104 may be of any shape, for example, a rectangular shape.

The storage area 104 includes a plurality of storage units (e.g., first through third storage units 120a-120c) for storing the deformable objects. Hereinafter, the first through third storage units 120a-120c are referred to as "the storage units 120". Examples of the storage units 120 may include, but are not limited to, multi-tier racks, pallet racks, portable mezzanine floors, vertical lift modules, horizontal carousels, or vertical carousels. In an embodiment, the storage units 120 may correspond to mobile storage units that are movable from one location to another location in the storage facility 102. In such a scenario, the movement of the storage units 120 may be enabled by the first through third mobile robots 106a-106c or any other mechanism known in the art.

Each storage unit 120 includes various shelves, and each shelf may be empty or may store the deformable objects in a stack. For example, the first storage unit 120a includes first through seventh shelves 122a-122g that store first through seventh stacks of deformable objects 124a-124g, respectively, and eighth and ninth shelves 122h and 122i that are empty. Likewise, the second storage unit 120b includes four shelves that store stacks of deformable objects and two shelves that are empty, and the third storage unit 120c includes two shelves that store stacks of deformable objects and one shelf that is empty. Hereinafter, the shelves of the first through third storage units 120a-120c and the stacks of deformable objects stored on the shelves of the first through third storage units 120a-120c are referred to as "the shelves 122" and "the stacks of deformable objects 124", respectively. The shelves 122 may have different shapes, sizes, and dimensions.

The storage facility 102 may be marked with various fiducial markers (not shown). Each fiducial marker may correspond to one of two types—location markers and storage unit markers. The location markers are located at pre-determined locations in the storage facility 102. The pre-determined locations may or may not conform to a specific pattern and may be subject to a configuration of the storage facility 102. The storage unit markers may uniquely identify each shelf 122 that constitute the storage units 120 or each storage unit 120. Examples of the fiducial markers may include, but or not limited to, barcodes, quick response (QR) codes, radio frequency identification device (RFID) tags, or the like. In one embodiment, a placement of the fiducial markers may be uniform (i.e., a distance between consecutive fiducial markers is constant). In another embodiment, the placement of the fiducial markers may be non-uniform (i.e., a distance between consecutive fiducial markers is variable).

The first through third mobile robots 106a-106c may be robotic vehicles that move in the storage facility 102. The first through third mobile robots 106a-106c may be autonomous mobile robots (AMRs), autonomous guided vehicles (AGVs), or a combination thereof. For the sake of brevity, it is assumed that the first through third mobile robots 106a-106c are AGVs, and are hereinafter referred to as "the first through third AGVs 106a-106c". The first through third AGVs 106a-106c (collectively referred to as "the AGVs 106") may be responsive to commands received from the control server 114. The AGVs 106 may include suitable logic, instructions, circuitry, interfaces, and/or code, executable by the circuitry, for executing various operations, such as transporting payloads (e.g., the storage units 120) in the storage facility 102. For example, the AGVs 106 may carry and transport the storage units 120 from the storage area 104 to the operation station 108, and from the operation station 108 to the storage area 104 for fulfillment of orders, loading of deformable objects onto the shelves 122, and/or the like.

The AGVs 106 may be configured to read the fiducial markers. For example, the AGVs 106 may include various sensors (such as image sensors, RFID sensors, and/or the like) for reading the fiducial markers. Each AGV 106 may utilize the fiducial markers for determining its relative position within the storage facility 102 and/or identifying the storage units 120. For the sake of brevity, in FIG. 1, the storage facility 102 is shown to include three AGVs (i.e., the AGVs 106). However, it will be apparent to those of skill in the art that the storage facility 102 may include any number of AGVs, without deviating from the scope of the disclosure.

The operation station 108 in the storage facility 102 is a pick-and-put station (PPS) where the deformable objects may be stored on the shelves 122 and/or retrieved from the shelves 122. The storage units 120 are transported to the operation station 108 by the AGVs 106. The deformable objects may be placed on the shelves 122 from the operation station 108 and/or retrieved from the shelves 122 and placed on a platform at the operation station 108 by way of the DARM 110. For the sake of brevity, in FIG. 1, the storage facility 102 is shown to include a single operation station 108. However, it will be apparent to those of skill in the art that the storage facility 102 may include any number of operation stations, without deviating from the scope of the disclosure.

The DARM 110 may include suitable logic, instructions, circuitry, interfaces, and/or code, executable by the circuitry, for executing various operations, such as handling a deformable object. The handling of the deformable object may correspond to one of adjusting an alignment of the deformable object in the stack and transporting the deformable object from a source location to a destination location in the storage facility 102. For example, the deformable object may be transported from the operation station 108 to a shelf of a storage unit. In another example, the deformable object may be transported from a shelf of a storage unit to another shelf of the same storage unit, to a shelf of another storage unit, or to the operation station 108. The storage units 120 are transported to a location that is within an operational range of the DARM 110 by the AGVs 106. In one example, the DARM 110 may be deployed in a vicinity of the operation station 108.

In some embodiments, the DARM 110 includes first and second robotic arms 126 and 128 and first and second end effectors 130 and 132 connected to the first and second robotic arms 126 and 128, respectively, for facilitating the handling of the deformable objects. To handle a deformable object, the DARM 110 may execute a pick operation on the deformable object, followed by a put-down operation. The pick operation includes, but is not limited to, gripping and partially lifting the deformable object by way of the first end effector 130, and lifting the partially lifted deformable object in entirety by way of the second end effector 132. The put-down operation includes, but is not limited to, placing the lifted deformable object at a destination location.

The DARM 110 receives various commands from the control server 114 for handling the deformable object, and under the control of the received commands, the DARM 110 executes the handling of the deformable object. For example, the DARM 110 may receive various commands from the control server 114 to place a deformable object, arranged in a stack (not shown) at the platform of the operation station 108, on a shelf (e.g., the fifth shelf 122*e*). Under the control of the received commands, the DARM 110 may pick the deformable object from the stack, and put down the picked deformable object on the fifth shelf 122*e*. Various components of the DARM 110 are explained in detail in conjunction with FIGS. 2A and 2B. For the sake of brevity, in FIG. 1, the storage facility 102 is shown to include a single DARM (i.e., the DARM 110) that operates in conjunction with the operation station 108. However, it will be apparent to those of skill in the art that the storage facility 102 may include any number of DARMs that may operate independently or in conjunction with an operation station (such as the operation station 108), without deviating from the scope of the disclosure.

The set of image sensors 112 may include suitable logic, instructions, circuitry, interfaces, and/or code, executable by the circuitry, for executing various operations, such as capturing images of the storage units 120. For example, the set of image sensors 112 may capture images of the stacks of deformable objects 124 that are arranged on the shelves 122

The set of image sensors 112 may then communicate information associated with the captured images (i.e., image data) to the control server 114. The set of image sensors 112 is installed such that images of all sides of the storage units 120 are captured by the set of image sensors 112. The set of image sensors 112 may be installed on walls or stands (not shown) in the vicinity of the DARM 110, on the first and second robotic arms 126 and 128, on the storage units 120, or the like. For the sake of brevity, it is assumed that a first subset of the set of image sensors 112 is installed on the first and second robotic arms 126 and 128, and a second subset of the set of image sensors 112 is installed on the walls or stands that are present in the vicinity of the DARM 110.

The control server 114 is a network of computers, a software framework, or a combination thereof, that may provide a generalized approach to create the server implementation. Examples of the control server 114 may include, but are not limited to, personal computers, laptops, mini-computers, mainframe computers, any non-transient and tangible machine that can execute a machine-readable code, cloud-based servers, distributed server networks, or a network of computer systems. The control server 114 may be realized through various web-based technologies such as, but not limited to, a Java web-framework, a .NET framework, a personal home page (PHP) framework, or any other web-application framework.

The control server 114 may be configured to implement a goods-to-person (GTP) setup in the storage facility 102, where the storage units 120 storing different inventory items (such as deformable objects) are picked up from the storage area 104 and transported to the operation station 108. The control server 114 may be further configured to control execution of different operations associated with replenishment of the storage units 120, an order sorting operation, palletization and/or de-palletization of inventory items, or the like. Some of the operations may include, but are not limited to, inventory profiling, pickup planning for inventory items, and inventory pickup and transfer to operation stations (such as the operation station 108). The control server 114 may be maintained by a warehouse management authority or a third-party entity that facilitates inventory management operations for the storage facility 102. Various components of the control server 114 and their functionalities are described later in conjunction with FIG. 5.

The control server 114 may receive, from a management server (not shown) at the storage facility 102, a handling request for handling a deformable object that is arranged in a stack. The handling request may be associated with an order fulfillment, an inventory management operation, or the like. The handling request may include a source location of the deformable object, a destination location of the deformable object, fiducial markers of shelves associated with the source and/or destination locations, a unique identifier of the deformable object, or the like. Although, the control server 114 and the management server are disclosed as separate entities, the scope of the disclosure is not limited to these embodiments. In various other embodiments, the functionalities of the management server may be integrated into the control server 114, without deviating from the scope of the disclosure. In such a scenario, the source and destination locations, the fiducial markers, the unique identifier, or the like, are identified by the control server 114 for the order fulfillment, the inventory management operation, or the like.

The control server 114 may communicate the source and destination locations to the DARM 110. Additionally, the control server 114 may communicate the source and destination locations to the AGVs 106 and path information of a path to be followed by the AGVs 106. Further, the control server 114 receives, from the set of image sensors 112, image data indicative of images of the storage units that are transported to a location within the operational range of the DARM 110 (e.g., the first storage unit 120a). Based on the image data, the control server 114 detects the stack that includes the deformable object to be handled (e.g., the fifth stack of deformable objects 124e arranged on the fifth shelf 122e). By utilizing one or more image processing techniques, the control server 114 processes the image data and determines a contour (shown in FIG. 3A) of the stack of deformable objects or of the deformable objects in the stack. As an example, the contour is an outline representing or bounding a shape. Hence, the contour of the stack includes, in some examples, outlines that represent various shapes in the stack. Each outline may be a layer that may indicate a fold of a deformable object or the deformable object in entirety. The control server 114 may then identify one or more layers (shown in FIG. 3A) in the contour.

The control server 114 may then identify perceived depth information of each deformable object in the detected stack based on the contour. The perceived depth information of a deformable object may indicate distance values from a focal plane of an image sensor (e.g., the set of image sensors 112) to different points on the deformable object. The control server 114 may retrieve, from the database 116, historical data associated with the detected stack or the deformable objects in the detected stack. The historical data may include physical attributes of each deformable object in the stack (e.g., shape, size, weight, a set of dimensions, a number of folds, actual depth information, or the like of each deformable object in the stack), various ways in which the stack of deformable objects (or similar type of objects) was handled previously, or the like. The actual depth information of each deformable object is a function of the shape, size, weight, a set of dimensions, and a number of folds of the corresponding deformable object. The previous handling of the stack may correspond to plan information indicating various sequences of actions that were performed to handle the deformable objects of the stack, in the past. Based on a comparison between the perceived and actual depth information of the deformable objects, the control server 114 may determine an orientation of the deformable object to be handled with respect to the remaining stack.

Although it is described that the actual depth information of each deformable object is included in the historical data, the scope of the present disclosure is not limited to it. In various other embodiments, the actual depth information of each deformable object in the stack may be determined in real-time by the control server 114 based on the image data and the physical attributes of each deformable object, without deviating from the scope of the present disclosure. In such a scenario, if the real-time determined actual depth information does not match the actual depth information included in the historical data, the actual depth information determined in real-time is compared with the perceived depth information of each deformable object to determine the orientation of the deformable object to be handled with respect to the remaining stack. Further, the historical data is updated by the control server 114 to include the actual depth information determined in real-time.

Upon determination of the layers in the contour and the orientation of the deformable object to be handled, the control server 114 may determine a sequence of actions to be performed by the DARM 110 to handle the deformable object whilst maintaining the original form factors of the deformable object and the remaining stack. An original form factor may define a non-deformed state of the deformable object. For example, the original form factor defines the preferred size, shape, and other physical specifications of an object in which it was stored originally in the stack. The control server 114 may determine the sequence of actions in real-time based on the contour, the layers, the orientation of the deformable object to be handled, and the historical data. The control server 114 may communicate a set of commands corresponding to each action in the sequence of actions to the DARM 110. By way of the set of commands, the control server 114 controls the DARM 110 to execute various operations for handling the deformable object. Upon successful handling of the deformable object by the DARM 110, the control server 114 may store the plan information (e.g., the set of commands corresponding to each action) associated with the sequence of actions in the database 116 to update the historical data associated with the handled deformable object and the corresponding stack. Various operations performed by the DARM 110 and the control server 114 to handle the deformable objects that are arranged in a stack are described in conjunction with FIGS. 3A-3E.

The database 116 may include suitable logic, instructions, circuitry, interfaces, and/or code to store the historical data and the set of commands corresponding to each action in the sequence of actions determined by the control server 114. Examples of the database 116 may include a random-access memory (RAM), a read-only memory (ROM), a removable storage drive, a hard disk drive (HDD), a flash memory, a solid-state memory, and the like. In one embodiment, the database 116 may be realized through various database technologies such as, but not limited to, Microsoft® SQL, Oracle®, IBM DB2®, Microsoft Access®, PostgreSQL®, MySQL® and SQLite. It will be apparent to a person skilled in the art that the scope of the disclosure is not limited to realizing the database 116 in form of an external database or a cloud storage working in conjunction with the control server 114, as described herein. In other embodiments, the database 116 may be realized in the control server 114, without departing from the scope of the disclosure.

In some embodiments, the communication network 118 is a medium (for example, multiple network ports and communication channels) through which content and messages are transmitted between the AGVs 106, the operation station 108, the DARM 110, the set of image sensors 112, and the control server 114. Examples of the communication network 118 may include, but are not limited to, a Wi-Fi network, a light fidelity (Li-Fi) network, a local area network (LAN), a wide area network (WAN), a metropolitan area network (MAN), a satellite network, the Internet, a fiber optic network, a coaxial cable network, an infrared (IR) network, a radio frequency (RF) network, and combinations thereof. Various entities in the environment 100 may connect to the communication network 118 in accordance with various wired and wireless communication protocols, such as Transmission Control Protocol and Internet Protocol (TCP/IP), User Datagram Protocol (UDP), Long Term Evolution (LTE) communication protocols, Hypertext Transfer Protocol (HTTP), File Transfer Protocol (FTP), Simple Mail Transfer Protocol (SMTP), Domain Network System (DNS), Common Management Interface Protocol (CMIP), or any combination thereof.

Thus, FIG. 1 describes a system for handling deformable objects that are arranged in a stack in the storage facility 102. In one embodiment, the system may include the DARM 110, the set of image sensors 112, the control server 114, and the database 116. In another embodiment, the system may include only the control server 114 that controls the DARM 110 for handling the deformable objects in the stack.

Figure 2A:
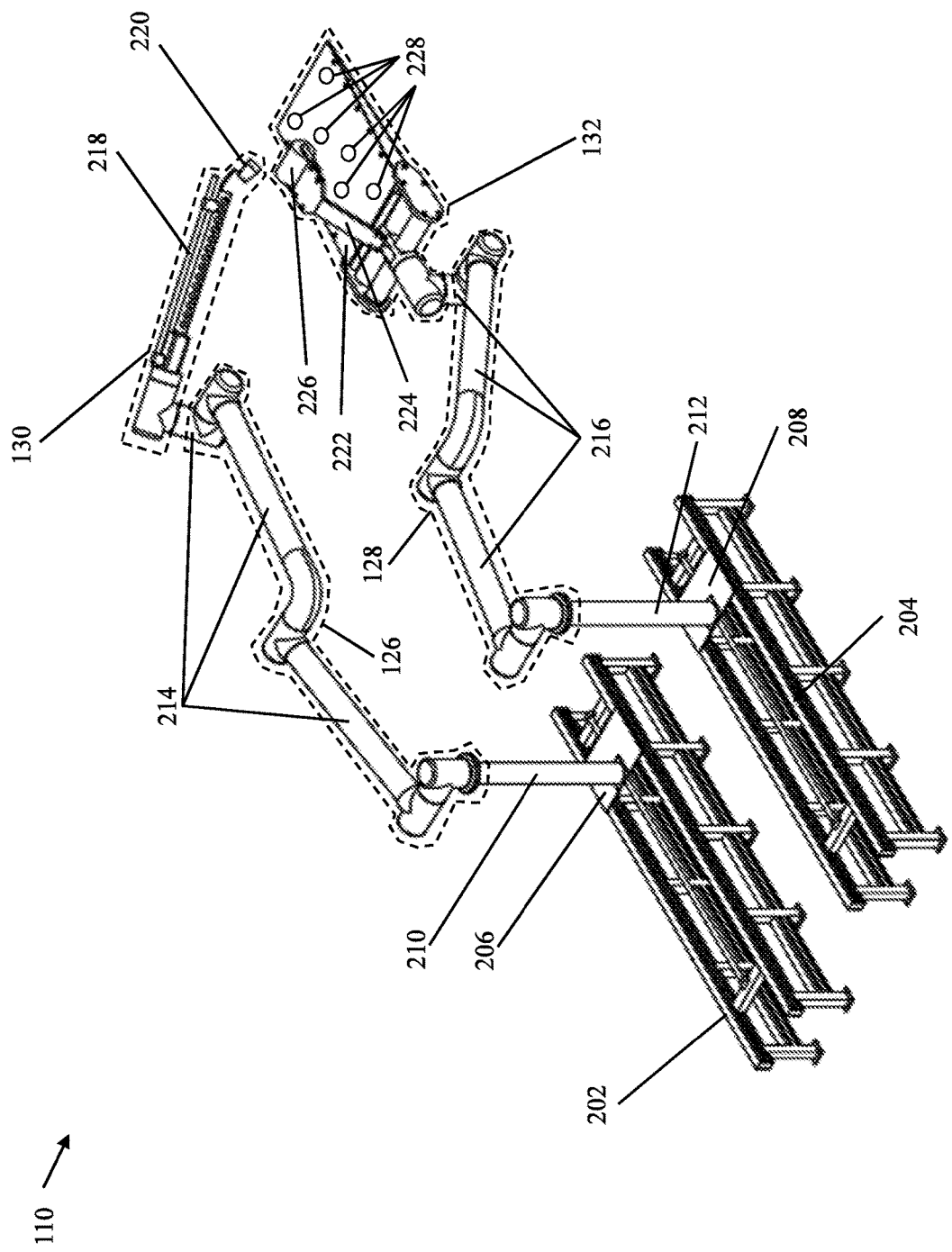
FIG. 2A is a perspective view of a dual-arm robotic manipulator (DARM) of FIG. 1, in accordance with an exemplary embodiment of the present disclosure.

FIG. 2A is a perspective view of the DARM 110, in accordance with an exemplary embodiment of the present disclosure. The DARM 110 may include first and second guide rails 202 and 204 having first and second carriages 206 and 208 mounted thereon, respectively. The DARM 110 may additionally include first and second actuators (not shown) to linearly displace the first and second carriages 206 and 208 back and forth (e.g., in a straight line) along the first and second guide rails 202 and 204, respectively. The DARM 110 may further include first and second columns 210 and 212, the first and second robotic arms 126 and 128, and the first and second end effectors 130 and 132.

The first and second carriages 206 and 208 support the first and second columns 210 and 212, respectively. The first carriage 206 is affixed at one end of the first column 210 and the first robotic arm 126 is mounted on the opposite end of the first column 210, as shown in FIG. 2A. Likewise, the second carriage 208 is affixed at one end of the second column 212 and the second robotic arm 128 is mounted on the opposite end of the second column 212.

The DARM 110 further includes, in some examples, first and second pluralities of actuators (not shown) in the first and second robotic arms 126 and 128, respectively. The first plurality of actuators may be present between two consecutively placed arm portions of a first plurality of arm portions 214 in the first robotic arm 126. Similarly, the second plurality of actuators may be present between two consecutively placed arm portions of a second plurality of arm portions 216 in the second robotic arm 128. The first and second pluralities of actuators may enable movement of the first and second pluralities of arm portions 214 and 216, along a defined number of degrees of freedom, such as six degrees of freedom. Alternatively, each actuator from the first and second pluralities of actuators may be a rotary actuator that may be activated separately to swivel a coupled arm portion along an axis of rotation (i.e., a roll, yaw, or a pitch) while keeping other arm portions static. The first and second end effectors 130 and 132 are tools, assemblies, or apparatus that may be coupled to the arm portions at free ends of the first and second robotic arms 126 and 128, respectively.

In one embodiment, the first end effector 130 is a vacuum gripper that includes a support arm 218 and a suction cup 220 connected to the support arm 218. The suction cup 220 generates vacuum pressure to grip various objects, and the support arm 218 provides support to the suction cup 220. Further, the second end effector 132 includes a spatula-shaped base 222, an adjustable arm 224 connected to the spatula-shaped base 222, and a roller 226 connected to the adjustable arm 224 such that the roller 226 is oriented parallel to and at an adjustable height above the spatula-shaped base 222. The spatula-shaped base 222 provides a flat surface for lifting various deformable objects, whereas the adjustable arm 224 and the roller 226 firmly hold the deformable object on the spatula-shaped base 222. In such a scenario, the DARM 110 may further include a third actuator for adjusting the height of the adjustable arm 224. The first through third actuators and the first and second pluralities of actuators are hereinafter collectively referred to as "the actuators".

The second end effector 132 may also include a set of pressure sensors 228 installed on the spatula-shaped base 222. The set of pressure sensors 228 records pressure exerted by a lifted deformable object on the second end effector 132 (e.g., the spatula-shaped base 222), and communicate pressure data corresponding to the recorded pressure to the control server 114. For the sake of brevity, in FIG. 2A, the set of pressure sensors 228 is shown to include six pressure sensors. However, it will be apparent to those of skill in the art that the set of pressure sensors 228 may include any number of pressure sensors, without deviating from the scope of the disclosure.

The first and second carriages 206 and 208, the first and second robotic arms 126 and 128, and the first and second end effectors 130 and 132, in conjunction with the actuators, define the operational range of the DARM 110. The operational range of the DARM 110 corresponds to an area in the vicinity of the DARM 110 within which the first and second end effectors 130 and 132 of the DARM 110 may handle objects. For example, the operational range of the DARM 110 corresponds to a reachable area within which the DARM 110 is capable of extending the first and second end effectors 130 and 132 based on the movements of the first and second carriages 206 and 208 and the first and second robotic arms 126 and 128.

The DARM 110 may further include a movement controller (not shown) that is connected to the control server 114 for receiving various commands corresponding to various actions that are to be performed by the DARM 110. The movement controller may be further connected to the actuators, and controls the actuators based on the commands received from the control server 114. For example, under the control of the commands received from the control server 114, the movement controller may generate various control signals and communicate the generated control signals to the actuators for controlling the movement of the first and second carriages 206 and 208, the first and second robotic arms 126 and 128, and the first and second end effectors 130 and 132. In some embodiments, the movement of the first and second carriages 206 and 208, the first and second robotic arms 126 and 128, and the first and second end effectors 130 and 132 is controlled by the movement controller such that the first and second robotic arms 126 and 128 and the first and second end effectors 130 and 132 do not collide with each other.

It will be apparent to a person skilled in the art that the first and second end effectors 130 and 132 as described in FIG. 2A are two examples of the end effectors that may be utilized in the DARM 110 and that the scope of the disclosure is not limited to it. In various other embodiments, various other types of end effectors may be utilized in the DARM 110 for facilitating the handling of the deformable objects, without deviating from the scope of the disclosure.

In one embodiment, the DARM 110 may be capable of moving from one location to another location by way of a movement mechanism, a set of wheels and motors. In another embodiment, the DARM 110 may be stationary.

Figure 2B:
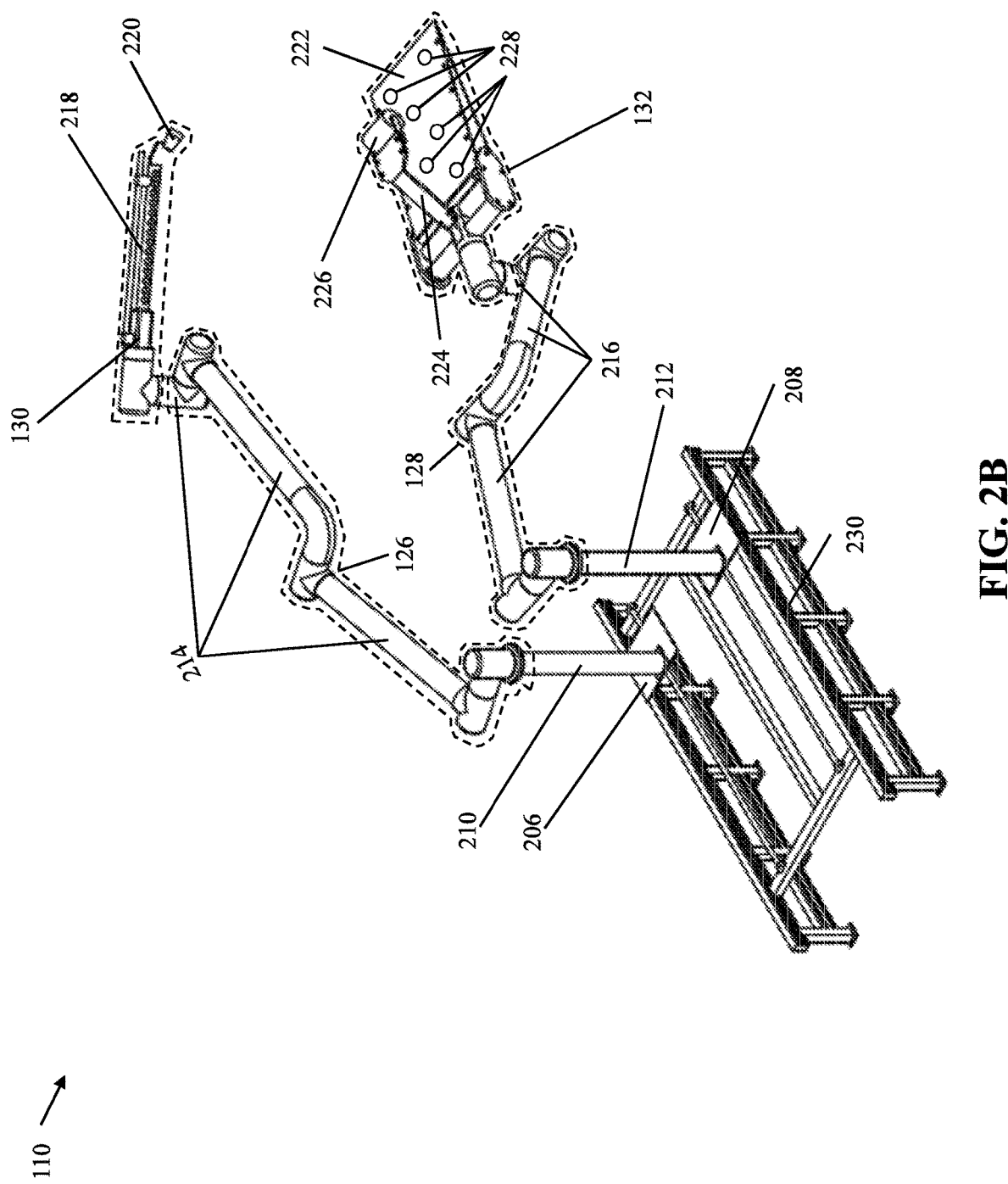
FIG. 2B is a perspective view of the DARM, in accordance with another exemplary embodiment of the present disclosure.

FIG. 2B is a perspective view of the DARM 110, in accordance with another exemplary embodiment of the present disclosure. The DARM 110 illustrated in FIG. 2B is functionally similar to the DARM 110 of FIG. 2A. The DARM 110 in FIG. 2B is structurally similar to the DARM 110 in FIG. 2A, except that the DARM 110 in FIG. 2B includes a single guide rail (i.e., a third guide rail 230)

having the first and second carriages 206 and 208 mounted thereon, instead of two separate guide rails 202 and 204.

FIGS. 3A-3E, collectively illustrate an exemplary scenario 300 for handling a deformable object that is arranged in a stack, in accordance with an exemplary embodiment of the present disclosure.

The control server 114 may receive the handling request for handling a deformable object that is arranged in a stack. In one embodiment, the deformable object may be on top of the stack. For the sake of brevity, it is assumed that the handling request corresponds to handling a first deformable object 302a in the fifth stack of deformable objects 124e that is arranged on the fifth shelf 122e of the first storage unit 120a. Hereinafter, the fifth stack of deformable objects 124e and the first deformable object 302a are interchangeably referred to as "the fifth stack 124e" and the "first object 302a", respectively. The fifth stack 124e further includes second and third deformable objects 302b and 302c that are stacked beneath the first object 302a. Hereinafter, the second and third deformable objects 302b and 302c are interchangeably referred to as the "second and third objects 302b and 302c".

The handling request may be for adjusting the alignment of the first object 302a in the fifth stack 124e or transporting the first object 302a from a source location in the storage facility 102 to a destination location in the storage facility 102 (e.g., another shelf of the same storage unit, a shelf of another storage unit, the operation station 108, or the like). The handling request includes the source and destination locations of the first object 302a, fiducial markers associated with the source and/or destination locations, and the unique identifier of the first object 302a. For the sake of brevity, it is assumed that the handling request corresponds to transporting the first object 302a from the fifth shelf 122e of the first storage unit 120a to the operation station 108. Accordingly, in some examples, the handling request includes the source location as the fifth shelf 122e of the first storage unit 120a, the destination location as the operation station 108, a fiducial marker of the fifth shelf 122e, and the unique identifier of the first object 302a.

Upon reception of the handling request, the control server 114 may identify one of the AGVs 106 (e.g., the first AGV 106a) for transporting the first storage unit 120a from a first location in the storage area 104 to a second location that is within the operational range of the DARM 110 for catering to the handling request. The identification of the first AGV 106a may be based on an availability of the first AGV 106a, a proximity of the first AGV 106a to the first storage unit 120a, or the like. The control server 114 may then communicate a storage unit marker and a location marker indicating the first storage unit 120a and the first location, respectively, to the first AGV 106a. The control server 114 may additionally communicate path information of various paths to be followed by the first AGV 106a to reach from a current location of the first AGV 106a to the first location, and from the first location to the second location. The path information may be determined by the control server 114 based on the current location of the first AGV 106a, the first and second locations, and a map or layout of the storage facility 102. Based on the first location, the first AGV 106a may approach the first storage unit 120a, and scan the storage unit marker at the first storage unit 120a to verify if the scanned storage unit marker matches the storage unit marker communicated by the control server 114. When the scanned storage unit marker matches the storage unit marker communicated by the control server 114, the first AGV 106a lifts and transports the first storage unit 120a from the first location in the storage area 104 to the second location that is within the operational range of the DARM 110.

When the first storage unit 120a is transported to the second location, the control server 114 communicates the source and destination locations to the DARM 110 (i.e., the movement controller). Based on the source location, the movement controller generates and communicates various control signals to the actuators for controlling the movement of the DARM 110 such that the DARM 110 is oriented in front of the first storage unit 120a. For example, based on the control signals, the actuators may control the first and second carriages 206 and 208 to move back and forth along the first and second guide rails 202 and 204, respectively. The actuators may further control the first and second robotic arms 126 and 128 to move along the defined number of degrees of freedom to orient the DARM 110 facing the first storage unit 120a.

Figure 3A:
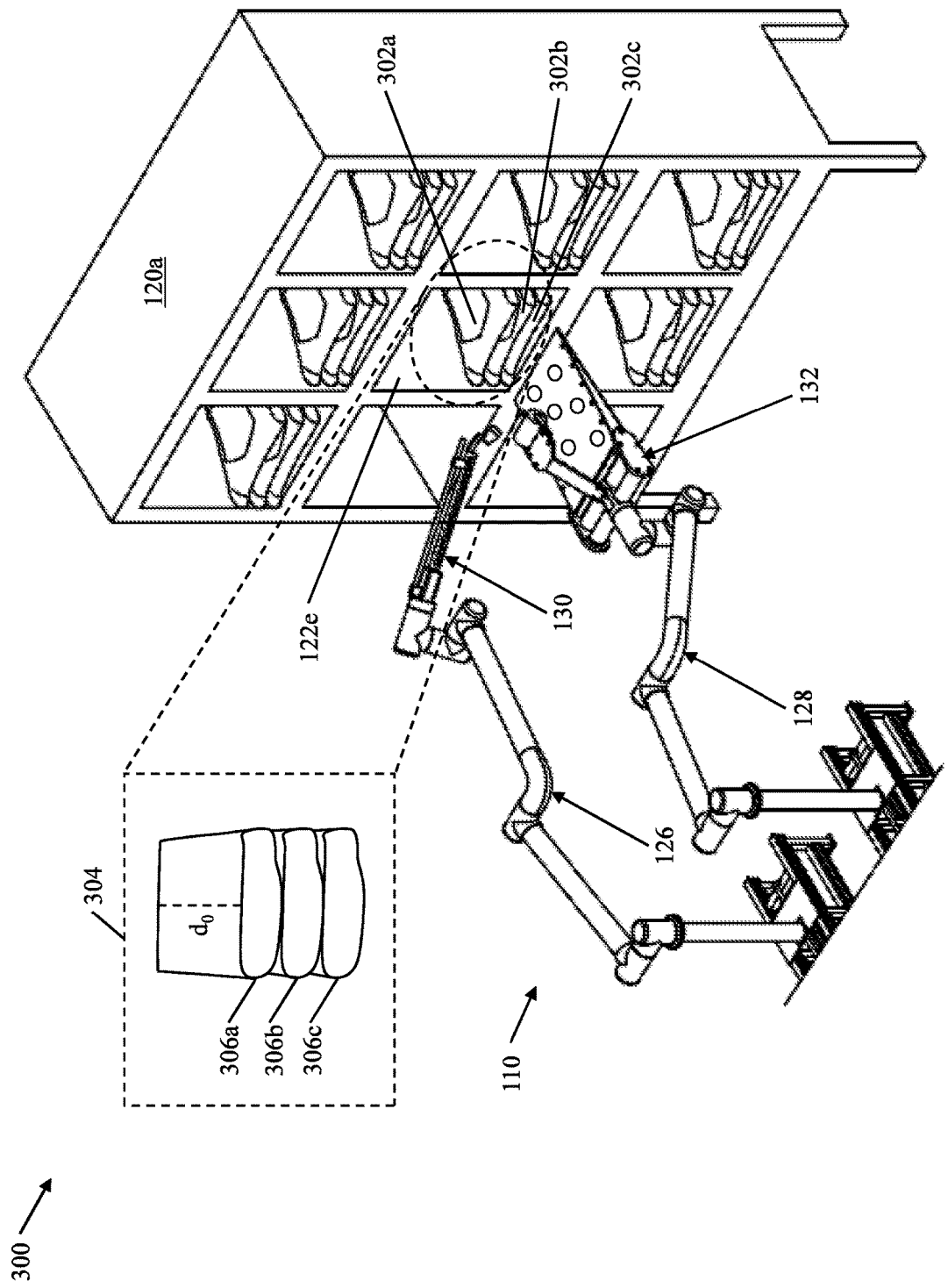

Referring now to FIG. 3A, the exemplary scenario 300 illustrates that the DARM 110 is oriented facing the first storage unit 120a. The DARM 110 may additionally include a scanner (not shown) for scanning a tag (not shown) that stores an identifier of the first object 302a. In an embodiment, the tag is attached to the first object 302a. In another embodiment, the tag is attached to the fifth shelf 122e. The identifier obtained from the scanned tag is communicated to the control server 114, and the control server 114 compares the received identifier with the unique identifier of the first object 302a included in the handling request. If the two identifiers do not match, the control server 114 may communicate a first alert notification to an operator device (not shown) of an operator (not shown) located at the operation station 108. The operator may then manually search for the first object 302a in the storage facility 102, and place the first object 302a at the destination location.

If the two identifiers match, the control server 114 may communicate various commands to the movement controller to orient the first subset of image sensors installed on the first and second robotic arms 126 and 128 in such a way that after orientation the first subset of image sensors faces the fifth shelf 122e. The first subset of image sensors thus captures various images of the fifth stack 124e arranged on the fifth shelf 122e, and communicates first image data indicative of the captured images to the control server 114. Similarly, the second subset of image sensors captures various images of the fifth stack 124e arranged on the fifth shelf 122e, and communicates second image data indicative of the captured images to the control server 114.

Based on the first and second image data, the control server 114 detects the fifth stack 124e, and determines the contour (hereinafter referred to and designated as "the contour 304") of the detected fifth stack 124e. For obtaining the contour 304, the control server 114 may be configured to process the first and second image data by utilizing one or more image processing techniques. The control server 114 may project each image in the first and second image data on a focal plane of a corresponding image sensor to obtain contour information of the detected fifth stack 124e (or each object 302a-302c in the detected fifth stack 124e) pertaining to that focal plane. The control server 114 may then merge the contour information across multiple focal planes to determine the contour 304. The control server 114 then identifies first through third layers 306a-306c in the contour 304. The first layer 306a in the contour 304 may indicate a fold of the first object 302a or the first object 302a in entirety. As illustrated in FIG. 3A, the first layer 306a indicates the first object 302a in entirety, and similarly, the second and third layers 306b and 306c indicate the second and third objects 302b and 302c in entirety, respectively. The control server 114 further identifies the perceived depth information of the first through third objects 302a-302c based on the contour 304. The perceived depth information of the first through third objects 302a-302c indicates depths of the first through third objects 302a-302c as viewed in the contour 304. The perceived depth information of the first object 302a is shown in FIG. 3A as "do". The control server 114 further retrieves, from the database 116, the historical data associated with the fifth stack 124e. Based on the perceived depth information and the actual depth information of the first through third deformable objects 302a-302c, the control server 114 may determine the orientation of the first object 302a with respect to the remaining deformable objects 302b and 302c in the fifth stack 124e. The control server 114 may further determine whether the orientation of the first object 302a with respect to the remaining deformable objects 302b and 302c is such that the first object 302a is aligned with the remaining stack (i.e., the second and third objects 302b and 302c). In an example, if the perceived depth information and the actual depth information of the first through third objects 302a-302c match, the control server 114 determines that the first object 302a is oriented in a manner that the first object 302a is aligned with the remaining stack. Alternatively, if the perceived depth information and the actual depth information of the first through third objects 302a-302c do not match, the control server 114 determines that the first object 302a is oriented in a manner that the first object 302a is misaligned with the remaining stack. For the sake of brevity, it is assumed that the perceived depth information and the actual depth information of the first through third objects 302a-302c match and the first object 302a is aligned with the remaining stack.

When the control server 114 determines that the first object 302a is aligned with the remaining stack, the control server 114 may determine the sequence of actions to be performed by the DARM 110 to handle the first object 302a while maintaining the original form factors of the first object 302a and the remaining stack. The control server 114 may determine the sequence of actions in real-time based on the contour 304, the first through third layers 306a-306c, the orientation of the first object 302a, and the historical data. In one embodiment, upon determining the sequence of actions, the control server 114 may run a simulation test to determine whether the execution of the determined sequence of actions results in successful handling of the first object 302a.

In another embodiment, the first object 302a (or a similar object) may be successfully handled previously, and the sequence of actions for handling the first object 302a may be included in the historical data. In such a scenario, the control server 114 retrieves the sequence of actions from the database 116. Thus, the computation associated with the determination of the sequence of actions is eliminated.

A first action in the sequence of actions may correspond to gripping the first object 302a from a gripping end (shown in FIG. 3B) and lifting the gripping end to a predetermined height. The control server 114 may identify the gripping end of the first object 302a based on the contour 304, the first through third layers 306a-306c, the orientation of the first object 302a, and the historical data. The gripping end is identified by the control server 114 such that the original form factors of the first object 302a and the remaining stack are maintained during the lift. In other words, the gripping end is identified by the control server 114 such that lifting the first object 302a from the gripping end does not change an appearance of the first object 302a from a folded state to an unfolded state (i.e., a deformed state). In one example, the gripping end is a closed end of a folded object.

If the control server 114 determines that the griping end of the first object 302a is on an end that is opposite to the one facing the DARM 110, the control server 114 may communicate various commands to the first AGV 106a to rotate the first storage unit 120a such that the gripping end of the first object 302a is facing the DARM 110. The control server 114 may then communicate information associated with the gripping end and a first set of commands corresponding to the first action to the DARM 110. The control server 114 may additionally communicate grip force and pressure details to the DARM 110.

Figure 3B:
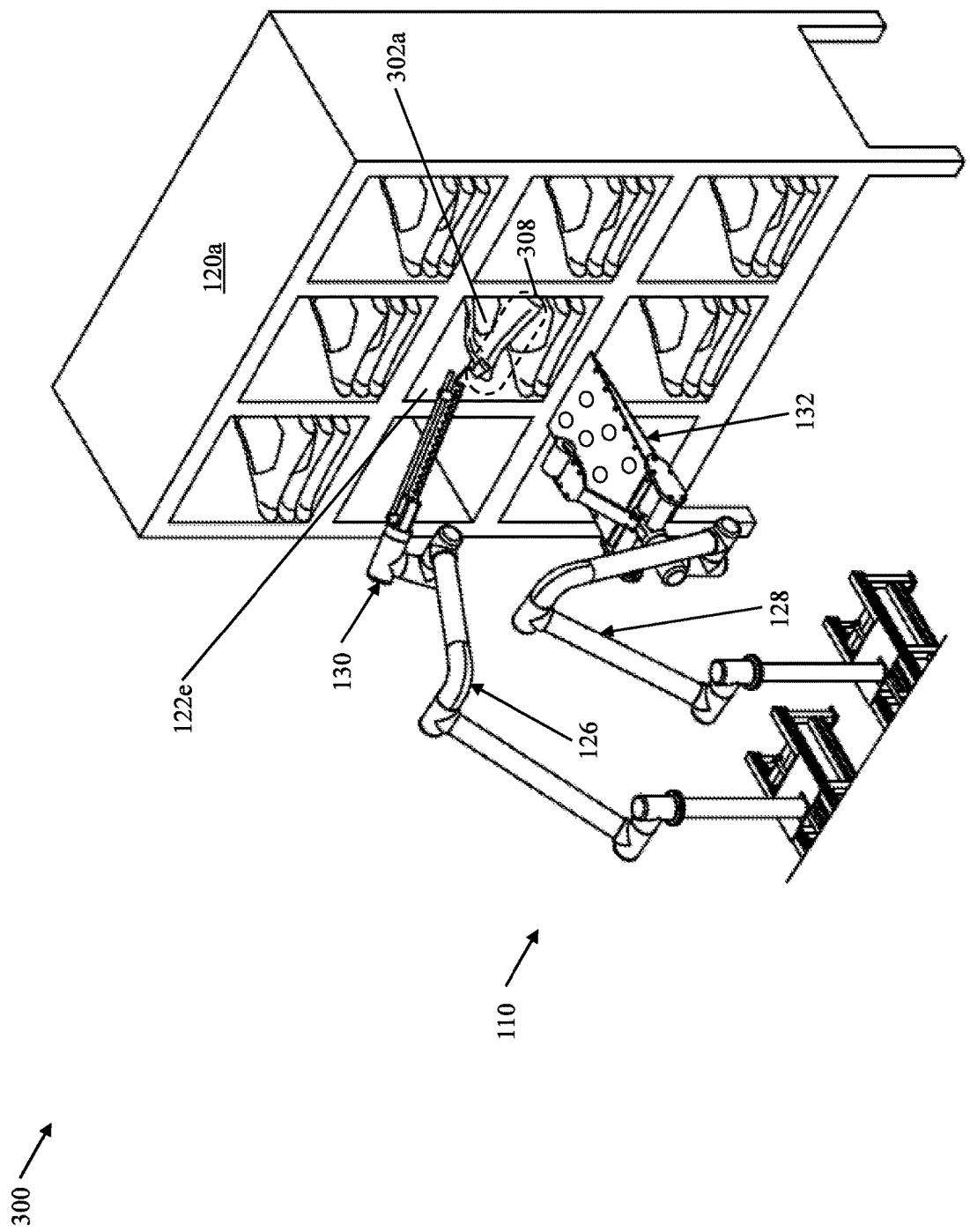

Referring now to FIG. 3B, the exemplary scenario 300 illustrates that under the control of the first set of commands, the movement controller may control the first robotic arm 126 (by communicating various control signals) to grip, by way of the suction cup 220, the gripping end (hereinafter referred to and designated as "the gripping end 308") of the first object 302a and lift the gripping end 308 to the predetermined height. The suction cup 220 may apply the grip force and pressure as communicated by the control server 114 to grip the gripping end 308. As the gripping end 308 is lifted by the first robotic arm 126, the set of image sensors 112 captures various images of the partially lifted first object 302a and the remaining stack, and communicate information corresponding to the captured images (i.e., third and fourth image data, respectively) to the control server 114. Based on the third and fourth image data and the historical data, the control server 114 identifies a gap developed between the partially lifted first object 302a and the remaining stack, and determines if the gap is equal to the predetermined height (i.e., whether the gripping end 308 is lifted to the predetermined height). When the control server 114 determines that the gripping end 308 is lifted to the predetermined height, the control server 114 communicates a second set of commands corresponding to a second action in the sequence of actions to the DARM 110. The second action corresponds to sliding a robotic arm beneath the partially lifted first object 302a, and lifting the first object 302a in entirety.

Referring now to FIG. 3C, the exemplary scenario 300 illustrates that under the control of the second set of commands, the movement controller controls the second robotic arm 128 to slide the second end effector 132 beneath the partially lifted first object 302a, and lift the first object 302a in entirety. In one embodiment, when the second end effector 132 slides beneath the partially lifted first object 302a, the second end effector 132 may not come in contact with the remaining stack (i.e., the second and third objects 302b and 302c). Thus, ensuring that the remaining stack is not deformed due to the handling of the first object 302a. When the second end effector 132 lifts the first object 302a, the set of pressure sensors 228 installed on the second end effector 132 (i.e., the spatula-shaped base 222) records the pressure exerted by the lifted first object 302a on the second end effector 132. Further, the set of pressure sensors 228 communicates the pressure data corresponding to the recorded pressure to the control server 114. The control server 114 determines whether the second end effector 132 has accurately lifted the first object 302a based on the pressure data received from the set of pressure sensors 228. The accurate lifting of the first object 302a corresponds to a uniform weight distribution of the first object 302a on the second end effector 132.

When the control server 114 determines that the first object 302a is inaccurately lifted, the control server 114 may communicate a second alert notification to the operator device of the operator located at the operation station 108. The operator may then adjust the positioning of the first object 302*a* on the second end effector 132, place the first object 302*a* back in the fifth stack 124*e*, or transport the first object 302*a* to the destination location. Alternatively, when the control server 114 determines that the first object 302*a* is inaccurately lifted, the second and first robotic arms 128 and 126 may be controlled by the movement controller (based on various commands received from the control server 114) to place the lifted first object 302*a* back in the fifth stack 124*e*, and to release the grip of the suction cup 220 on the first object 302*a*, respectively.

When the control server 114 determines, in some examples, that the second robotic arm 128, by way of the second end effector 132, has accurately lifted the first object 302*a*, the control server 114 communicates, to the DARM 110, a third set of commands corresponding to a third action in the sequence of actions. The third action may correspond to the release of the grip of the suction cup 220 on the gripping end 308, and the adjustment of the height of the adjustable arm 224 such that the roller 226 is firmly in contact with the first object 302*a*.

Figure 3D:
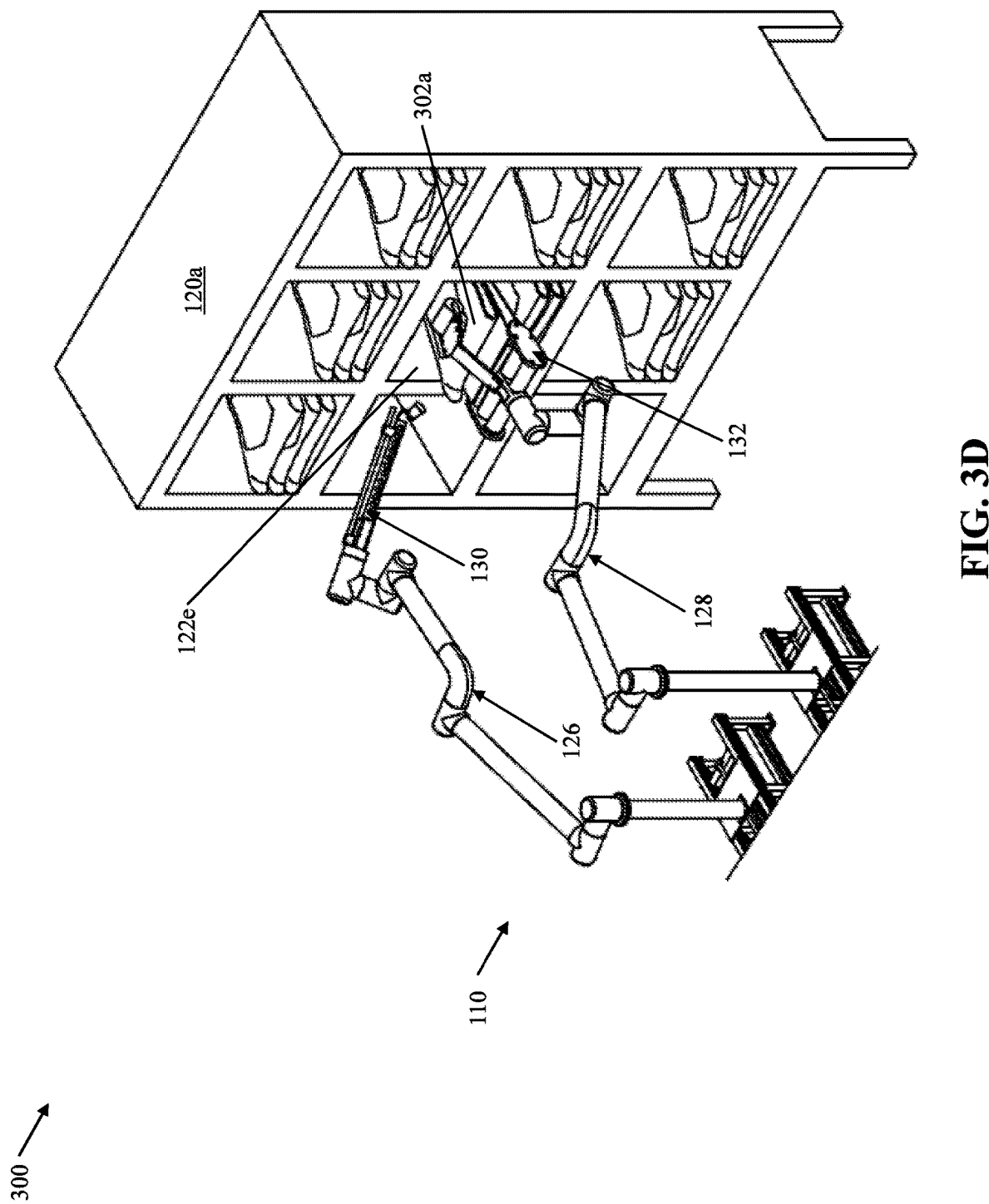

Referring now to FIG. 3D, the exemplary scenario 300 illustrates that under the control of the third set of commands, the movement controller controls the first robotic arm 126 to release the hold of the suction cup 220 on the first object 302*a*. The movement controller further controls the second robotic arm 128 to adjust the height of the adjustable arm 224 such that the roller 226 firmly holds the first object 302*a*. The roller 226 assists in maintaining the form factor of the first object 302*a* when the first object 302*a* is moved by the second end effector 132. The DARM 110 thus successfully completes the pick operation. In one embodiment, upon successful completion of the pick operation, the first robotic arm 126 is disengaged from the handling operation of the first object 302*a*, and may be utilized for handling another object of the same storage unit or an object of another storage unit that is in queue at the operation station 108. When the first object 302*a* is successfully picked up, the control server 114 communicates, to the DARM 110, a fourth set of commands corresponding to a fourth action in the sequence of actions. The fourth action may correspond to transporting the picked first object 302*a* to the operation station 108.

Figure 3E:
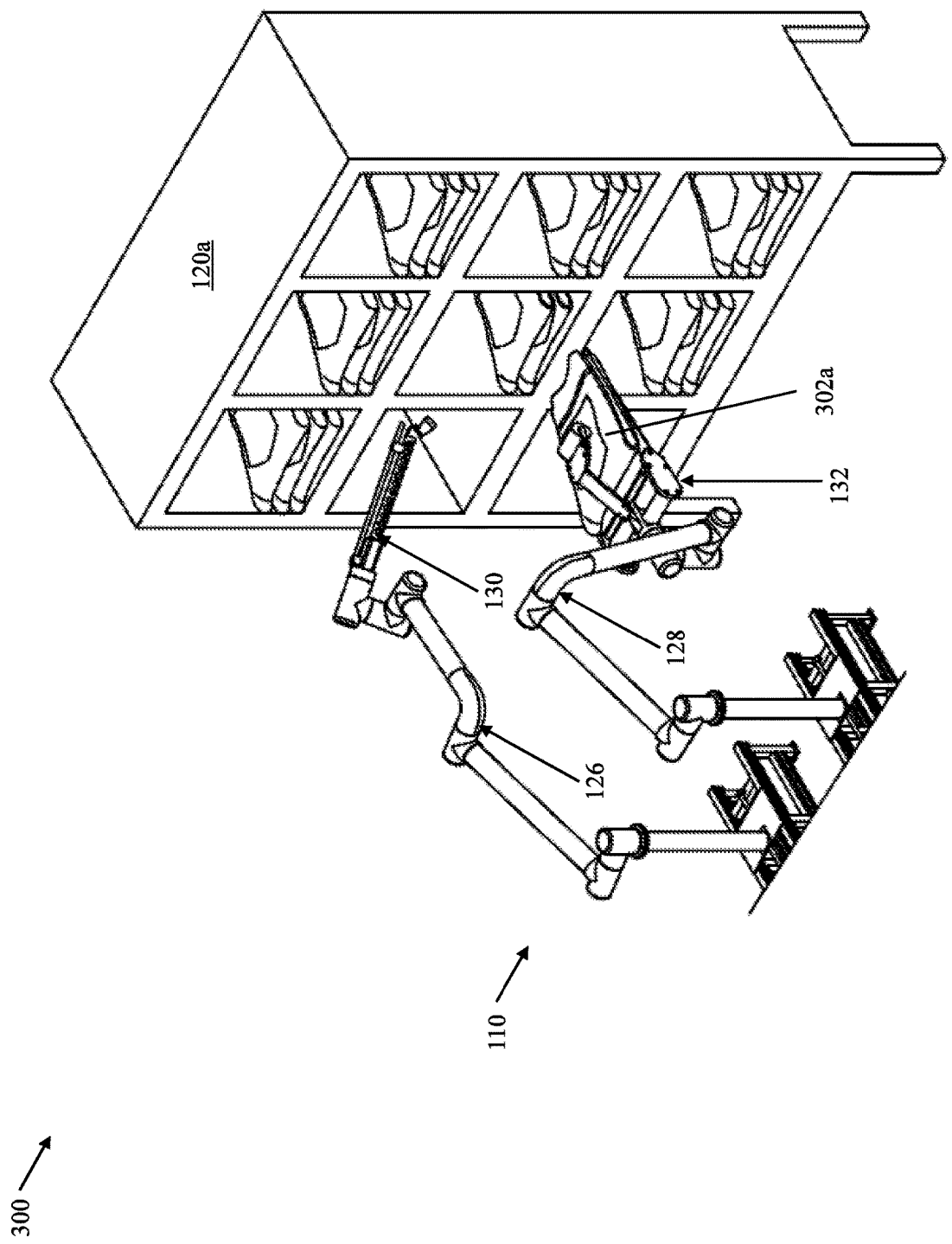

Referring now to FIG. 3E, the exemplary scenario 300 illustrates that under the control of the fourth set of commands, the movement controller controls the second robotic arm 128 to move the second end effector 132 holding the first object 302*a* away from the fifth shelf 122*e*. The second end effector 132 may then place the first object 302*a* at the operation station 108. The DARM 110 thus successfully completes the put-down operation, and thereby successfully handling the first object 302*a*. In one embodiment, to place the first object 302*a* at the operation station 108, the movement controller may control the second robotic arm 128 to adjust the adjustable arm 224 such that the roller 226 is no longer in contact with the first object 302*a*. The movement controller may then control the first robotic arm 126 to grip, by way of the first end effector 130, the first object 302*a* from the gripping end 308 and lift the gripping end 308 to the predetermined height. When the gripping end 308 is lifted to the predetermined height, the movement controller may control the second robotic arm 128 to withdraw the second end effector 132 from beneath the first object 302*a*. The movement controller may then control the first robotic arm 126 to release the grip of the first end effector 130 on the first object 302*a*. The first object 302*a* is thus successfully transported from the fifth shelf 122*e* to the operation station 108.

After the successful handling of the first object 302*a*, the control server 114 may store the plan information of the determined sequence of actions as feedback in the database 116 to update the historical data associated with the first object 302*a* and reduce the computation time during the subsequent handling of the first object 302*a* (or a similar object) that is arranged in a similar stack.

It will be apparent to a person skilled in the art that an object may be transported from a stack arranged on a shelf of a storage unit to another shelf of the same storage unit or from a stack arranged on a shelf of one storage unit to a shelf of another storage unit in a similar manner as described above for transporting the first object 302*a* as described above. Further, an object may be transported from a stack arranged at the operation station 108 to a shelf of a storage unit in a similar manner as described above for transporting the first object 302*a*. Further, when the handling corresponds to adjusting the alignment of the first object 302*a* in the fifth stack 124*e*, the first object 302*a* may be lifted by the second end effector 132 that is oriented parallel to the alignment of the first object 302*a*. Upon lifting, the orientation of the second end effector 132 may adjusted such that the second end effector 132 is parallel to the remaining stack. The second end effector 132 may then put-down the first object 302*a* on top of the second object 302*b*. The first object 302*a* is lifted and put-down in a similar manner as described above. In such a scenario, the source and destination locations are same (i.e., the fifth shelf 122*e*). Additionally, when the handling corresponds to the transport of a deformable object that is misaligned in the stack, the second end effector 132 may lift the misaligned deformable object in the aforementioned manner, and put-down the lifted object at the destination location.

Although FIGS. 1 and 3A-3E describe a GTP setup, the scope of the present disclosure is not limited to it. In various other embodiments, the control server 114 may be configured to implement a person-to-goods (PTG) setup in the storage facility 102, where the DARM 110 is moved to the first location of the first storage unit 120*a* for executing the pick operation, and then to the destination location (e.g., the operation station 108) for executing the put-down operation.

Although FIGS. 3A-3E describe that the orientation of the first object 302*a* is aligned with the remaining stack, the scope of the disclosure is not limited to it. In another embodiment, the first object 302*a* may be misaligned with respect to the remaining stack. The misaligned orientation of the first object 302*a* and the operations performed by the control server 114 in such a scenario are explained in conjunction with FIG. 4.

Although FIGS. 1 and 3A-3E describe that the handling request is indicative of and associated with the handling of a deformable object, the scope of the present disclosure is not limited to it. In various other embodiments, the handling request received by the control server 114 may not indicate whether the object to be handled is a deformable object. In such a scenario, the control server 114 may determine whether the object to be handled is a deformable object based on the source location of the object to be handled, the image data received from the second subset of the set of image sensors 112, and the historical data. For example, the image data received from the second subset of the set of image sensors 112 may depict that the object that is to be handled is an apparel and folded in multiple layers, thus indicating the object to be a deformable object. Likewise, the physical attributes in the historical data may indicate that the object to be handled is an apparel, which is deformable in nature. When the object to be handled is determined to be a deformable object, the control server 114 handles the object in a similar manner as described above in FIGS. 3A-3E.

Figure 4:
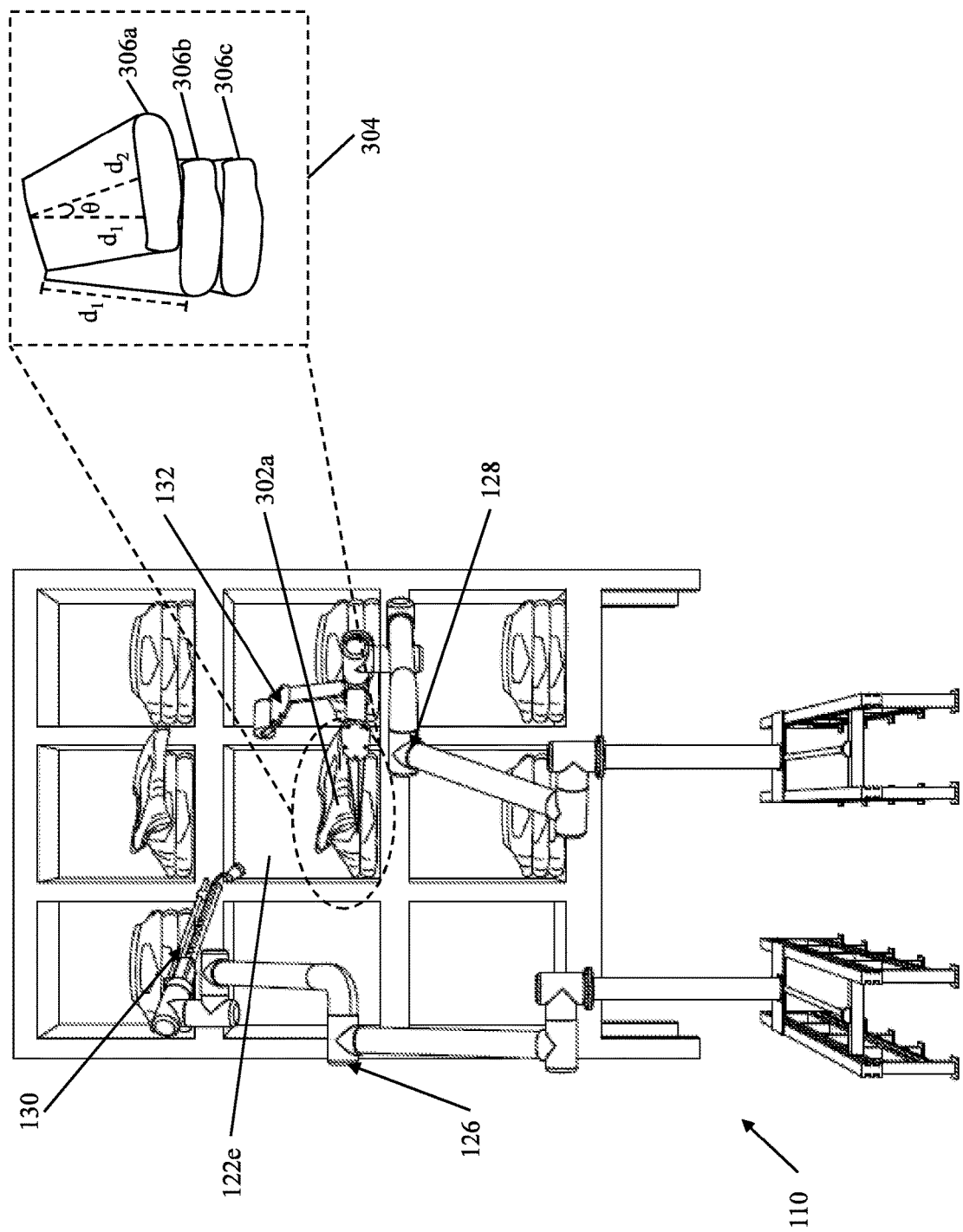
FIG. 4 is a perspective view that illustrates handling of misaligned deformable objects in the stack, in accordance with an exemplary embodiment of the present disclosure.

FIG. 4 is a perspective view that illustrates handling of misaligned deformable objects in a stack, in accordance with an exemplary embodiment of the present disclosure. In one exemplary scenario, based on the historical data of the first through third objects 302a-302c, the control server 114 may determine that the actual depth information of each of the first through third objects 302a-302c is "$d_1$". Further, based on the processing of the first and second image data, the control server 114 may determine the contour 304 of the first through third objects 302a-302c that are arranged in the fifth stack 122e. From the contour 304, the control server 114 may identify that the perceived depth information for the second and third objects 302b and 302c is same as the respective actual depth information of the second and third objects 302b and 302c. However, the control server 114 may determine that the perceived depth information of the first object 302a is "$d_2$", which is greater than the actual depth information "$d_1$" of the first object 302a. Due to mismatch between the perceived depth information "$d_2$" and the actual depth information "$d_1$" of the first object 302a, the control server 114 may determine that the first object 302a is misaligned with respect to the remaining fifth stack 124e. As illustrated in FIG. 4, the first object 302a is shown to be misaligned by an angle θ. In such a scenario, the misaligned first object 302a may be lifted with the second end effector 132 which is oriented in parallel to the alignment of the first object 302a. The second end effector 132 may then place the first object 302a at the destination location.

In another embodiment, the control server 114 may communicate a third alert notification to the operator device of the operator. The operator may then adjust the positioning of the first object 302a in the fifth stack 124e or transport the first object 302a to the destination location. The operator may alternatively take over the control of the DARM 110 to lift the misaligned first object 302a and place the first object 302a at the destination location. It will be apparent to a person skilled in the art that similar actions may be performed for various other misaligned deformable objects in the first storage unit 120a.

Figure 5:
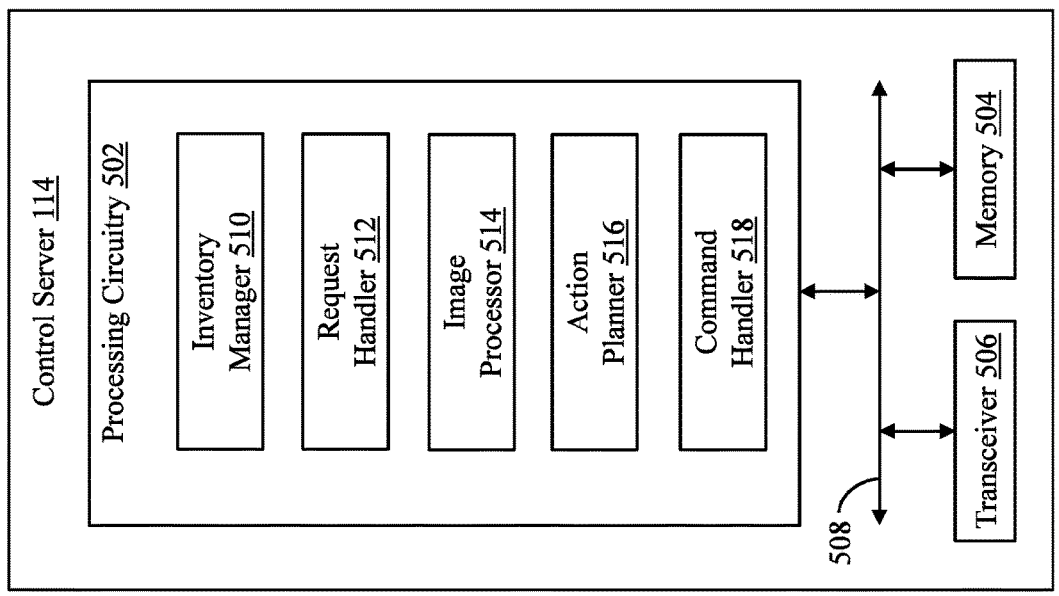
FIG. 5 is a block diagram that illustrates a control server of FIG. 1, in accordance with an exemplary embodiment of the present disclosure.

FIG. 5 is a block diagram that illustrates the control server 114, in accordance with an exemplary embodiment of the present disclosure. In some embodiments, the control server 114 may include processing circuitry 502, a memory 504, and a transceiver 506 that communicate with each other by way of a communication bus 508. The processing circuitry 502 may include an inventory manager 510, a request handler 512, an image processor 514, an action planner 516, and a command handler 518. It will be apparent to a person having ordinary skill in the art that the control server 114 is for illustrative purposes and not limited to any specific combination or hardware circuitry and/or software.

The processing circuitry 502 executes various operations, such as inventory or warehouse management operations, procurement operations, or the like. The processing circuitry 502 executes the inventory management operations, such as determining the sequence of actions to be performed by the DARM 110 for handling deformable objects (as described in the foregoing descriptions of FIGS. 3A-3E) and to facilitate transport of the deformable objects whilst maintaining the corresponding original form factor. The processing circuitry 502 executes the inventory or warehouse management operations by way of the inventory manager 510, the request handler 512, the image processor 514, the action planner 516, and the command handler 518.

The inventory manager 510 includes suitable logic, instructions, circuitry, interfaces, and/or code for managing an inventory list that includes a list of deformable objects stored in the storage facility 102, a number of units of each deformable object stored in the storage facility 102, and a source location (i.e., a shelf and/or a storage unit) where each deformable object is stored. For example, the inventory manager 510 may add new deformable objects to the inventory list when the new deformable objects are stored in the storage area 104 and may update the inventory list whenever there is any change in regards to the deformable objects stored in the storage area 104 (e.g., when items are retrieved from the storage units 120 for fulfillment of orders).

The request handler 512 includes suitable logic, instructions, circuitry, interfaces, and/or code for processing all handling requests received by the control server 114. The request handler 512 may identify deformable objects pertinent to the handling requests, and the shelves 122 that store the deformable objects associated with the handling requests. The request handler 512 may further communicate, for fulfillment of the handling requests, details regarding the deformable objects (such as the source location, the destination location, the fiducial markers, the unique identifiers, or the like) to the DARM 110 and the AGVs 106. Additionally, the request handler 512 may merge various handling requests when objects to be handled are stored in the same storage unit.

The image processor 514 includes suitable logic, instructions, circuitry, interfaces, and/or code for receiving the first and second image data from the set of image sensors 112. By utilizing one or more image processing techniques on the first and second image data, the image processor 514 detects the stack of deformable objects (e.g., the fifth stack 124e) and determines the contour of the stack of deformable objects (e.g., the contour 304 of the fifth stack 124e). The image processor 514 further identifies the one or more layers in the contour (e.g., the first through third layers 306a-306c). Further, the image processor 514 identifies the perceived depth information of each deformable object 302a-302c in the fifth stack 124e based on the contour 304. The image processor 514 further retrieves the historical data from the memory 504 or the database 116. Based on the perceived and actual depth information of each deformable object 302a-302c in the fifth stack 124e, the image processor 514 may determine the orientation of the first deformable object 302a that is to be handled with respect to the remaining fifth stack 124e. Additionally, the image processor 514 may identify the gripping end 308 of the first deformable object 302a that is to be handled based on the contour 304, the first through third layers 306a-306c, the orientation of the first deformable object 302a with respect to the remaining fifth stack 124e, and the historical data.

The image processor 514 further receives the third and fourth image data from the set of image sensors 112, while the gripping end 308 is partially lifted by the first end effector 130. Based on the third and fourth image data and the historical data, the image processor 514 identifies the gap developed between the partially lifted first deformable object 302a and the remaining fifth stack 124e, and determines if the gap is equal to the predetermined height (i.e., whether the gripping end 308 is lifted to the predetermined height).

The action planner 516 includes suitable logic, instructions, circuitry, interfaces, and/or code for determining various actions to be performed by the DARM 110. For example, the action planner 516 may determine the sequence of actions to be performed by the DARM 110 to handle the first deformable object 302a whilst maintaining the original form factors of the first deformable object 302a and the remaining fifth stack 124e. The control server 114 may determine the sequence of actions in real-time based on the contour 304, the first through third layers 306a-306c, the orientation of the first deformable object 302a that is to be handled, and the historical data. The action planner 516 also executes various other operations such as determining whether the orientation of the first deformable object 302a with respect to the remaining fifth stack 124e is such that the first deformable object 302a is aligned with the remaining fifth stack 124e, determining whether the second end effector 132 has accurately lifted the first deformable object 302a, generating the first through third alert notifications, or the like. The action planner 516 may further store the determined sequence of actions in the memory 504 or the database 116 for future use, e.g., handling the second and third deformable objects 302b and 302c in the fifth stack 124e.

The command handler 518 includes suitable logic, instructions, circuitry, interfaces, and/or code for generating various commands corresponding to the actions determined by the action planner 516. For example, the command handler 518 generates the first through fourth sets of commands corresponding to the first through fourth actions in the sequence of actions, respectively. The command handler 518 further generates the commands for orienting the first subset of image sensors installed on the first and second robotic arms 126 and 128 in front of the shelf on which the first deformable object 302a that is to be handled is arranged, the commands for rotating a storage unit such that the gripping end 308 of the first deformable object 302a is facing the DARM 110, or the like.

Examples of the inventory manager 510, the request handler 512, the image processor 514, the action planner 516, and the command handler 518 may include, but are not limited to, an application-specific integrated circuit (ASIC) processor, a reduced instruction set computing (RISC) processor, a complex instruction set computing (CISC) processor, a field-programmable gate array (FPGA), a microcontroller, a combination of a central processing unit (CPU) and a graphics processing unit (GPU), or the like.

The memory 504 includes suitable logic, instructions, circuitry, interfaces to store one or more instructions that are executed by the inventory manager 510, the request handler 512, the image processor 514, the action planner 516, and the command handler 518 for performing one or more operations. Additionally, the memory 504 may store the inventory list, the map or the layout of the storage facility 102, or the like. In one embodiment, the information stored in the database 116 may be stored in the memory 504, without deviating from the scope of the disclosure. Examples of the memory 504 may include a RAM, a ROM, a removable storage drive, an HDD, a flash memory, a solid-state memory, and the like.

The transceiver 506 transmits and receives data over the communication network 118 using one or more communication network protocols. The transceiver 506 may transmit various messages and commands to the AGVs 106 and the DARM 110 and receive image and pressure data from the set of image sensors 112 and the set of pressure sensors 228, respectively. Examples of the transceiver 506 may include, but are not limited to, an antenna, a radio frequency transceiver, a wireless transceiver, a Bluetooth transceiver, an ethernet based transceiver, a universal serial bus (USB) transceiver, or any other device configured to transmit and receive data.

Figure 6A:
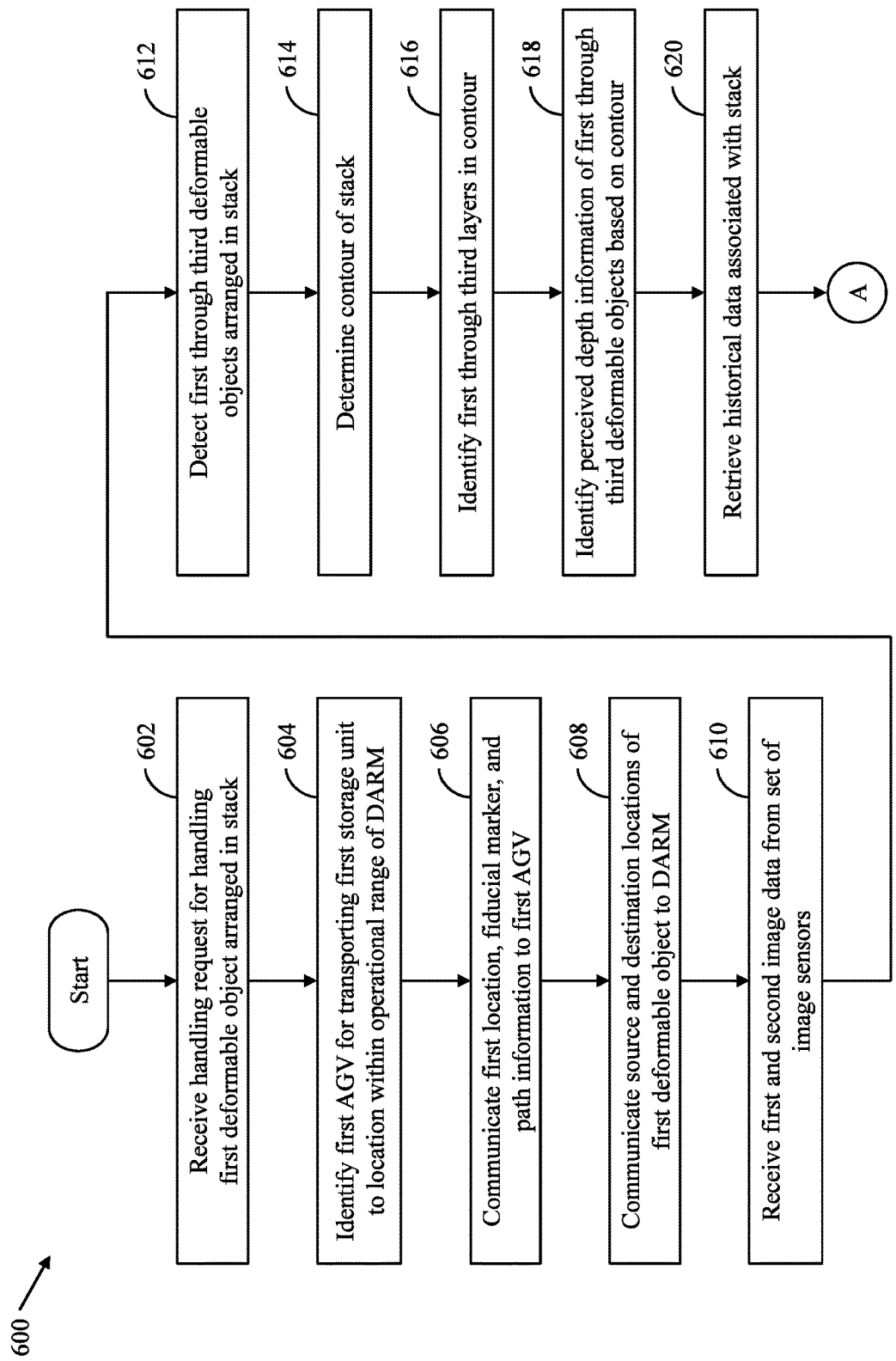
FIGS. 6A-6C, collectively represent a flow chart that illustrates a process for handling the deformable object that is arranged in the stack, in accordance with an exemplary embodiment of the present disclosure.
Figure 6B:
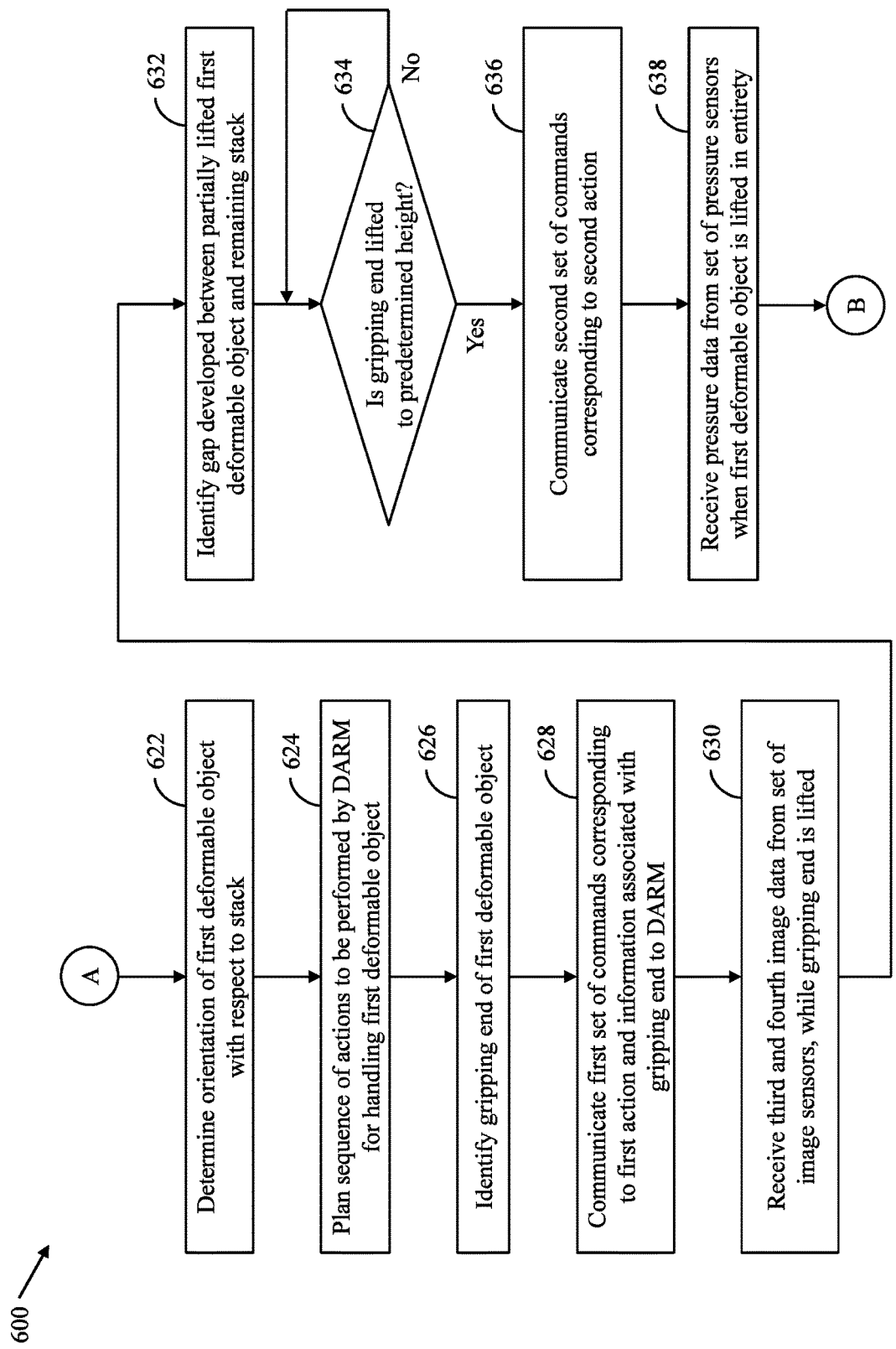
Figure 6C:
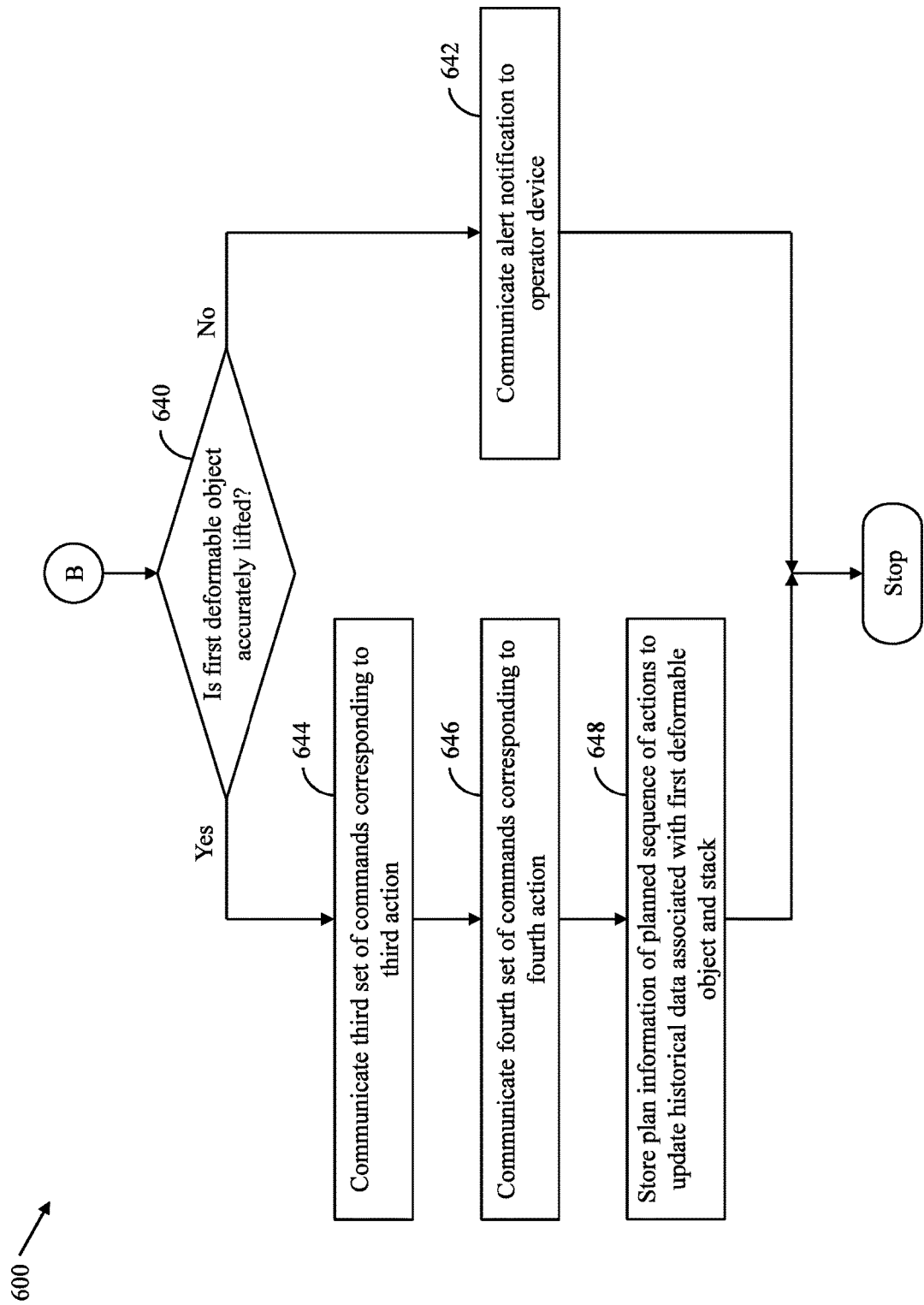

FIGS. 6A-6C, collectively represent a flow chart 600 that illustrates a process (i.e., a method) for handling a deformable object arranged in a stack, in accordance with an exemplary embodiment of the disclosure. Referring now to FIG. 6A, the process may generally start at step 602, where the control server 114 may receive the handling request for handling a deformable object that is arranged in a stack. In one embodiment, the deformable object is on top of the stack. For the sake of brevity, it is assumed that the handling request corresponds to transporting the first deformable object 302a arranged on the fifth shelf 122e of the first storage unit 120a to the operation station 108. The handling request thus includes the source location as the fifth shelf 122e, the destination location as the operation station 108, the fiducial marker of the fifth shelf 122e, and the unique identifier of the first deformable object 302a.

The process proceeds to step 604, where the control server 114 may identify one of the AGVs 106 (e.g., the first AGV 106a) for transporting the first storage unit 120a from the first location in the storage area 104 to the second location that is within the operational range of the DARM 110 for catering to the handling request. The identification of the first AGV 106a may be based on the availability of the first AGV 106a, the proximity of the first AGV 106a to the first storage unit 120a, or the like. The process proceeds to step 606, where the control server 114 communicates, to the first AGV 106a, the first location of the first storage unit 120a, the fiducial marker of the first storage unit 120a, and the path information of the paths to be followed by the first AGV 106a to reach the first location from the current location, and from the first location to the second location. The first AGV 106a may then approach the first location, lift the first storage unit 120a, and transport the first storage unit 120a from the storage area 104 to the second location that is within the operational range of the DARM 110.

The process proceeds to step 608, where the control server 114 communicates the source and destination locations of the first deformable object 302a to the DARM 110 (i.e., the movement controller) when the first storage unit 120a is transported to the second location. Based on the source location, the movement controller generates and communicates various control signals to the actuators for controlling the movement of the DARM 110 such that the DARM 110 is oriented to face the first storage unit 120a.

The process proceeds to step 610, where the control server 114 receives the first and second image data from the set of image sensors 112. The process proceeds to step 612, where based on the first and second image data, the control server 114 detects the first through third deformable objects 302a-302c arranged in the fifth stack 124e. Although three deformable objects are used in the present process, as understood by one of ordinary skill in the art, the present process may be performed on any number of deformable objects. The process then proceeds to step 614, where the control server 114 determines the contour 304 of the fifth stack 124e and the first through third deformable objects 302a-302c based on the first and second image data. The process then proceeds to step 616, where the control server 114 identifies the first through third layers 306a-306c in the contour 304. The first layer 306a in the contour 304 may indicate a fold of the first deformable object 302a or the first deformable object 302a in entirety. The process then proceeds to step 618, where the control server 114 identifies the perceived depth information of the first through third deformable objects 302a-302c based on the contour 304. The process then proceeds to step 620, where the control server 114 retrieves, from the database 116 or the memory 504, the historical data associated with the fifth stack 124e. The process then proceeds to process A as shown in FIG. 6B.

Referring now to FIG. 6B, the process A proceeds to step 622, where based on the perceived and actual depth information, the control server 114 determines the orientation of the first deformable object 302a with respect to the fifth stack 124e. For the sake of brevity, it is assumed that the first deformable object 302a is aligned with the remaining stack (i.e., the second and third deformable objects 302b and 302c).

The process proceeds to step 624, where the control server 114 determines the sequence of actions to be performed by the DARM 110 to handle the first deformable object 302a while maintaining the original form factors of the first deformable object 302a and the remaining stack. The control server 114 may determine the sequence of actions in real-time based on the contour 304, the first through third layers 306a-306c, the orientation of the first deformable object 302a, and the historical data.

The process proceeds to step 626, where the control server 114 identifies the gripping end 308 of the first deformable object 302a based on the contour 304, the first through third layers 306a-306c, the orientation of the first deformable object 302a, and the historical data. The gripping end is identified such that the original form factors of the first deformable object 302a and the remaining stack are maintained during the lift. The process proceeds to step 628, where the control server 114 communicates the information associated with the gripping end 308 and the first set of commands corresponding to the first action to the DARM 110. Under the control of the first set of commands, the movement controller may control the first robotic arm 126 to grip, by way of the suction cup 220, the gripping end 308 of the first deformable object 302a and lift the gripping end 308 to the predetermined height.

The process proceeds to step 630, where the control server 114 receives, while the gripping end 308 is lifted by the first robotic arm 126, the third and fourth image data from the set of image sensors 112. The process then proceeds to step 632, where based on the third and fourth image data and the historical data, the control server 114 identifies the gap developed between the partially lifted first deformable object 302a and the remaining stack. The process then proceeds to step 634, where the control server 114 determines whether the gripping end 308 is lifted to the predetermined height (i.e., whether the gap is equal to the predetermined height). If at step 634, the control server 114 determines that the gripping end 308 is lifted to the predetermined height, the process proceeds to step 636. If at step 634, the control server 114 determines that the gripping end 308 is not lifted to the predetermined height, the height of the gripping end 308 is adjusted and step 634 is repeated until the gripping end 308 is lifted to the predetermined height. At step 636, the control server 114 communicates the second set of commands corresponding to the second action in the sequence of actions to the DARM 110. Under the control of the second set of commands, the movement controller controls the second robotic arm 128 to slide the second end effector 132 beneath the partially lifted first deformable object 302a, and lift the first deformable object 302a in entirety.

When the second end effector 132 lifts the first deformable object 302a, the set of pressure sensors 228 installed on the second end effector 132 (i.e., the spatula-shaped base 222) record the pressure exerted by the lifted first deformable object 302a on the second end effector 132. The process proceeds to step 638, where the control server 114 receives the pressure data corresponding to the recorded pressure from the set of pressure sensors 228 when the first deformable object 302a is lifted in entirety. The process then proceeds to process B as shown in FIG. 6C.

Referring now to FIG. 6C, the process B proceeds to step 640, where the control server 114 determines whether the second end effector 132 has accurately lifted the first deformable object 302a based on the pressure data received from the set of pressure sensors 228. If at step 640, the control server 114 determines that the first deformable object 302a is inaccurately lifted by the second end effector 132, the process proceeds to step 642. At step 642, the control server 114 communicates an alert notification (e.g., the second alert notification) to the operator device of the operator located at the operation station 108. The operator may then adjust the positioning of the first deformable object 302a on the second end effector 132, place the first deformable object 302a back in the fifth stack 124e, or transport the first deformable object 302a to the destination location.

If at step 640, the control server 114 determines that the second robotic arm 128, by way of the second end effector 132, has accurately lifted the first deformable object 302a, the process proceeds to step 644. At step 644, the control server 114 communicates, to the DARM 110, the third set of commands corresponding to the third action in the sequence of actions. Under the control of the third set of commands, the movement controller controls the first robotic arm 126 to release the hold of the suction cup 220 on the first deformable object 302a. The movement controller further controls the second robotic arm 128 to adjust the height of the adjustable arm 224 such that the roller 226 firmly holds the first deformable object 302a. The roller 226 assists in maintaining the form factor of the first deformable object 302a when the first deformable object 302a is moved by the second end effector 132. The DARM 110 thus successfully completes the pick operation.

The process proceeds to step 646, where when the first deformable object 302a is successfully picked up, the control server 114 communicates, to the DARM 110, the fourth set of commands corresponding to the fourth action. Under the control of the fourth set of commands, the movement controller controls the second robotic arm 128 to move the second end effector 132 holding the first deformable object 302a away from the fifth shelf 122e and towards the operation station 108, and place the first deformable object 302a at the operation station 108. The DARM 110 thus successfully completes the put-down operation, and thereby successfully handling the first deformable object 302a.

The process then proceeds to step 648, where after the successful handling of the first deformable object 302a, the control server 114 stores the plan information of the determined sequence of actions in the database 116 or the memory 504 to update the historical data associated with the first deformable object 302a and the fifth stack 124e, and reduce the computation time during the subsequent handling of the first deformable object 302a (or a similar object) that is arranged in a similar stack.

Techniques consistent with the present disclosure provide, among other features a method and system for handling one or more deformable objects arranged in a stack. While various exemplary embodiments of the disclosed system and method have been described above, it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the width or scope.

The control server 114 utilizes the DARM 110 to ensure that the form factor of the first deformable object 302a is maintained during the handling of the first deformable object 302a (i.e., during the pick-up, the transport, and/or the placement). In other words, the use of vacuum gripper and spatula-shaped end effectors 130 and 132 prevents the deformation of the first deformable object 302a during the handling. Further, the use of the spatula-shaped end effector 132 ensures that the remaining deformable objects in the stack, e.g., the second and third deformable objects 302b and 302c, are unaffected (i.e., are not deformed) during the handling of the first deformable object. The control server 114 may store the determined sequence of actions in the database 116 and re-use the stored sequence of actions for handling other deformable objects in a similar manner, thereby reducing the time required for handling the deformable objects in the storage facility 102. Thus, the handling of the deformable objects as described in the disclosure is more efficient as compared to other known deformable object handling methods.

While various embodiments of the present disclosure have been illustrated and described, it will be clear that the present disclosure is not limited to these embodiments only. Numerous modifications, changes, variations, substitutions, and equivalents will be apparent to those skilled in the art, without departing from the spirit and scope of the present disclosure, as described in the claims.

What is claimed is:

1. A system for handling one or more deformable objects that are arranged in a stack, the system comprising:
    a dual-arm robotic manipulator comprising:
        first and second robotic arms; and
        first and second end effectors connected to the first and second robotic arms, respectively;
    a set of image sensors configured to capture a first set of images of the stack; and
    a control server in communication with the dual-arm robotic manipulator and the set of image sensors, the control server configured to:
        detect the one or more deformable objects arranged in the stack based on the first set of images captured by the set of image sensors;
        determine a contour of the detected one or more deformable objects based on the first set of images;
        determine, based on the contour, a sequence of a plurality of actions to be performed by the dual-arm robotic manipulator for handling a first deformable object in the stack, wherein the handling includes a pick operation to be executed on the first deformable object; and
        control, in the pick operation based on the determined sequence of the plurality of actions:
            the first robotic arm to grip the first deformable object from a gripping end by way of the first end effector, and lift the gripped end to a predetermined height to partially lift the first deformable object;
            the second robotic arm to slide the second end effector beneath the partially lifted first deformable object, and lift the first deformable object in entirety; and
            the first robotic arm to release the grip of the first end effector on the first deformable object for successfully executing the pick operation.

2. The system of claim 1, wherein the handling further includes a put-down operation to be executed on the successfully picked first deformable object, and wherein, in the put-down operation, the control server is further configured to control, based on the determined sequence of the plurality of actions, the second robotic arm to put-down the successfully picked first deformable object at a destination location.

3. The system of claim 2, further comprising a database associated with the control server, wherein the control server is further configured to store, upon successful handling of the first deformable object, plan information associated with the sequence of the plurality of actions in the database.

4. The system of claim 1, wherein the sequence of the plurality of actions to be performed by the dual-arm robotic manipulator is further determined based on historical data associated with the one or more deformable objects, wherein the historical data includes at least one of a set of physical attributes of each of the one or more deformable objects or information associated with previous handling of the one or more deformable objects, and wherein the set of physical attributes of each deformable object includes at least one of a shape, a size, a weight, a set of dimensions, a number of folds, or actual depth information, of the corresponding deformable object.

5. The system of claim 4, wherein the control server is further configured to:
    identify one or more layers in the contour, wherein a first layer in the contour corresponds to a fold of the first deformable object or the first deformable object in entirety;
    identify, based on the contour, perceived depth information of each of the one or more deformable objects; and
    determine an orientation of the first deformable object with respect to the stack based on the perceived depth information of each of the one or more deformable objects and the historical data, wherein the sequence of the plurality of actions to be performed by the dual-arm robotic manipulator is further determined based on the one or more layers in the contour and the orientation of the first deformable object.

6. The system of claim 5, wherein the control server is further configured to identify the gripping end based on the contour, the one or more layers, the orientation of the first deformable object, and the historical data.

7. The system of claim 1, further comprising:
    a storage unit having a plurality of shelves, wherein the one or more deformable objects are arranged in the stack on a first shelf of the plurality of shelves; and
    a mobile robot that is configured to transport to the storage unit from a first location to a second location that is within an operational range of the dual-arm robotic manipulator.

8. The system of claim 1, wherein the set of image sensors is further configured to capture a second set of images of the stack, while the first robotic arm lifts the gripping end of the first deformable object, and wherein the control server is further configured to determine, based on the second set of images, whether the gripping end of the first deformable object is lifted to the predetermined height.

9. The system of claim 1, wherein the second end effector comprises a set of pressure sensors that is configured to record, when the second end effector lifts the first deformable object, pressure data corresponding to pressure exerted by the lifted first deformable object on the second end effector, wherein the control server is further configured to determine whether the second end effector has accurately lifted the first deformable object based on the recorded pressure data, and wherein the accurate lifting of the first deformable object corresponds to a uniform weight distribution of the first deformable object on the second end effector.

10. The system of claim 1, wherein the first end effector is a vacuum gripper, and wherein the second end effector includes a spatula-shaped base, an adjustable arm connected to the spatula-shaped base, and a roller connected to the adjustable arm such that the roller is oriented parallel to and at an adjustable height above the spatula-shaped base.

11. A method for handling one or more deformable objects that are arranged in a stack, the method comprising:
    detecting, by a control server, the one or more deformable objects arranged in the stack based on a first set of images of the stack captured by a set of image sensors;
    determining, by the control server, a contour of the detected one or more deformable objects based on the first set of images;
    determining, by the control server, based on the contour, a sequence of a plurality of actions to be performed by a dual-arm robotic manipulator for handling a first deformable object in the stack, wherein the handling includes a pick operation to be executed on the first deformable object; and
    controlling, by the control server in the pick operation based on the determined sequence of the plurality of actions:
        a first robotic arm of the dual-arm robotic manipulator to grip the first deformable object from a gripping end by way of a first end effector connected to the first robotic arm, and lift the gripped end to a predetermined height to partially lift the first deformable object;
        a second robotic arm of the dual-arm robotic manipulator to slide a second end effector connected to the second robotic arm beneath the partially lifted first deformable object, and lift the first deformable object in entirety; and
        the first robotic arm to release the grip of the first end effector on the first deformable object for successfully executing the pick operation.

12. The method of claim 11, wherein the handling further includes a put-down operation to be executed on the successfully picked first deformable object, and wherein, in the put-down operation based on the determined sequence of the plurality of actions, the second robotic arm is further controlled by the control server to place the successfully picked first deformable object at a destination location.

13. The method of claim 12, further comprising storing, by the control server upon successful handling of the first deformable object, plan information associated with the sequence of the plurality of actions in a database associated with the control server.

14. The method of claim 11, wherein the sequence of the plurality of actions to be performed by the dual-arm robotic manipulator is further determined based on historical data associated with the one or more deformable objects, wherein the historical data includes at least one of a set of physical attributes of each of the one or more deformable objects or information associated with previous handling of the one or more deformable objects, and wherein the set of physical attributes of each deformable object includes at least one of a shape, a size, a weight, a set of dimensions, a number of folds, or actual depth information, of the corresponding deformable object.

15. The method of claim 14, further comprising:
    identifying, by the control server, one or more layers in the contour, wherein a first layer in the contour corresponds to a fold of the first deformable object or the first deformable object in entirety;
    identifying, by the control server based on the contour, perceived depth information of each of the one or more deformable objects; and
    determining, by the control server, an orientation of the first deformable object with respect to the stack based on the perceived depth information of each of the one or more deformable objects and the historical data, wherein the sequence of the plurality of actions to be performed by the dual-arm robotic manipulator is further determined based on the one or more layers in the contour and the orientation of the first deformable object.

16. The method of claim 15, further comprising identifying, by the control server, the gripping end based on the contour, the one or more layers, the orientation of the first deformable object, and the historical data.

17. The method of claim 11, further comprising determining, by the control server, whether the gripping end of the first deformable object is lifted to the predetermined height based on a second set of images of the stack captured by the set of image sensors, wherein the second set of images of the stack is captured by the set of image sensors while the first robotic arm lifts the gripping end of the first deformable object.

18. The method of claim 11, further comprising determining, by the control server, whether the second end effector has accurately lifted the first deformable object based on pressure data recorded by a set of pressure sensors installed on the second end effector, wherein the pressure data corresponds to pressure exerted by the first deformable object on the second end effector when the first deformable object is lifted by the second end effector, and wherein the accurate lifting of the first deformable object corresponds to a uniform weight distribution of the first deformable object on the second end effector.

19. A system for handling one or more deformable objects that are arranged in a stack, the system comprising:
    a control server configured to:
        detect the one or more deformable objects arranged in the stack based on a first set of images of the stack captured by a set of image sensors;
        determine a contour of the detected one or more deformable objects based on the first set of images;
        determine, based on the contour, a sequence of a plurality of actions to be performed by a dual-arm robotic manipulator for handling a first deformable object in the stack, wherein the handling includes a pick operation to be executed on the first deformable object; and
        control, in the pick operation based on the determined sequence of the plurality of actions:
            a first robotic arm of the dual-arm robotic manipulator to grip the first deformable object from a gripping end by way of a first end effector connected to the first robotic arm, and lift the gripped end to a predetermined height to partially lift the first deformable object;
            a second robotic arm of the dual-arm robotic manipulator to slide a second end effector connected to the second robotic arm beneath the partially lifted first deformable object, and lift the first deformable object in entirety; and the first robotic arm to release the grip of the first end effector on the first deformable object for successfully executing the pick operation.

20. The system of claim 19, wherein the handling further includes a put-down operation to be executed on the successfully picked first deformable object, and wherein, in the put-down operation based on the determined sequence of the plurality of actions, the control server is further configured to control the second robotic arm to place the successfully picked first deformable object at a destination location.

* * * * *